United States Patent
Zhao

(10) Patent No.: US 11,424,869 B2
(45) Date of Patent: Aug. 23, 2022

(54) METHOD, DEVICE, AND SYSTEM FOR TRANSMITTING INFORMATION, AND STORAGE MEDIUM

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 59 days.

(21) Appl. No.: 17/014,743

(22) Filed: Sep. 8, 2020

(65) Prior Publication Data
US 2020/0403735 A1 Dec. 24, 2020

Related U.S. Application Data

(63) Continuation of application No. PCT/CN2018/078611, filed on Mar. 9, 2018.

(51) Int. Cl.
*H04W 4/00* (2018.01)
*H04L 1/18* (2006.01)
(Continued)

(52) U.S. Cl.
CPC ......... *H04L 1/1819* (2013.01); *H04B 7/0626* (2013.01); *H04W 72/042* (2013.01);
(Continued)

(58) Field of Classification Search
None
See application file for complete search history.

(56) References Cited

U.S. PATENT DOCUMENTS

| 8,483,698 B2 | 7/2013 | Papasakellariou et al. |
| 8,670,379 B2 | 3/2014 | Yamada et al. |

(Continued)

FOREIGN PATENT DOCUMENTS

| CN | 102378385 A | 3/2012 |
| CN | 103229541 A | 7/2013 |

(Continued)

OTHER PUBLICATIONS

International Search Report dated Dec. 13, 2018 in International Application No. PCT/CN2018/078611, (5 pages) (with English translation).

(Continued)

*Primary Examiner* — Clemence S Han
(74) *Attorney, Agent, or Firm* — Oblon, McClelland, Maier & Neustadt, L.L.P.

(57) ABSTRACT

The subject disclosure provides a method, device, and system for transmitting information, and a storage medium relating to the field of wireless communication. The method may include a step that a target HARQ is multiplexed on a second uplink resource when a first uplink resource and the second uplink resource overlap in a time domain, and transmission of the target Hybrid Automatic Repeat Request (HARQ) is delay-able. The first uplink resource is an uplink resource allocated by a base station to User Equipment (UE) for transmitting the target HARQ. The second uplink resource is an uplink resource allocated by the base station to the UE for transmitting uplink data or target Uplink Control Information (UCI). The target UCI includes a Scheduling Request (SR) or Channel State Information (CSI). The first uplink resource is located ahead of the second uplink resource in the time domain.

17 Claims, 10 Drawing Sheets

(51) Int. Cl.
*H04W 76/11* (2018.01)
*H04W 76/27* (2018.01)
*H04B 7/06* (2006.01)
*H04W 72/04* (2009.01)
*H04W 72/12* (2009.01)

(52) U.S. Cl.
CPC ............. *H04W 72/0413* (2013.01); *H04W 72/0446* (2013.01); *H04W 72/1263* (2013.01); *H04W 76/11* (2018.02); *H04W 76/27* (2018.02)

(56) References Cited

U.S. PATENT DOCUMENTS

| | | |
|---|---|---|
| 9,197,367 B2 | 11/2015 | Yamada et al. |
| 2010/0311431 A1 | 12/2010 | Papasakellariou et al. |
| 2012/0082157 A1 | 4/2012 | Yamada et al. |
| 2014/0133439 A1 | 5/2014 | Yamada et al. |
| 2016/0381674 A1* | 12/2016 | Kim .................. H04L 1/189 370/329 |
| 2017/0215179 A1 | 7/2017 | Choi et al. |
| 2019/0090258 A1* | 3/2019 | Ryu .................. H04B 7/0632 |
| 2019/0261391 A1* | 8/2019 | Kundu ................ H04L 1/0026 |
| 2020/0077470 A1* | 3/2020 | Xiong ................ H04L 1/1854 |

FOREIGN PATENT DOCUMENTS

| | | |
|---|---|---|
| CN | 103427940 A | 12/2013 |
| CN | 104683082 A | 6/2015 |
| CN | 106233649 A | 12/2016 |
| CN | 106471755 A | 3/2017 |

OTHER PUBLICATIONS

Written Opinion dated Dec. 13, 2018 in International Application No. PCT/CN2018/078611. (3 pages).

Combined Chinese Office Action and Search Report dated Sep. 24, 2020, in Patent Application No. 201880000171.0 (with English translation), 21 pages.

"Remaining Open Items on Long PUCCH" Nokia, Nokia Shanghai Bell, 3GPP TSG-RAN WG1 #92 R1-1802024 Feb. 16, 2018, 7 pages (entire document).

"UCI Piggyback on PUSCH for URLLC" Huawei, HiSilicon, 3GPP TSG-RAN WG1 #92 R1-1801357, Feb. 17, 2018, 10 pages (entire document).

"Remaining Issues on UCI Multiplexing" Huawei, HiSilicon, 3GPP TSG-RAN WG1 #92 R1-1803257, Feb. 23, 2018, 8 pages (entire document).

* cited by examiner

UE multiplexes a target HARQ on a second uplink resource when a first uplink resource and the second uplink resource overlap in a time domain, and transmission of the target HARQ is delay-able ~201

FIG. 2

A base station sends delay information to UE. The delay information indicates whether transmission of a target HARQ is delay-able ~301

FIG. 3

METHOD, DEVICE, AND SYSTEM FOR TRANSMITTING INFORMATION, AND STORAGE MEDIUM

CROSS-REFERENCE TO RELATED APPLICATIONS

This application is a continuation of International Application No. PCT/CN2018/078611 filed on Mar. 9, 2018, the entire contents of which are incorporated herein by reference.

TECHNICAL FIELD

The subject disclosure relates to the field of wireless communication, including a method, device, and system for transmitting information, and a storage medium.

BACKGROUND

In a wireless communication system, User Equipment (UE) may have to report Uplink Control Information (UCI) to a base station. UCI may include a Hybrid Automatic Repeat Request (HARQ), a Scheduling Request (SR), Channel State Information (CSI), and the like. In general, UE may send UCI to a base station through a Physical Uplink Control Channel (PUCCH).

A base station may be configured, for UE, multiple PUCCHs (for transmitting different types of UCI) that coincide in a time domain. Alternatively, a base station may be configured, for UE, a PUCCH (for transmitting UCI), and a Physical Uplink Shared Channel (PUSCH, for transmitting uplink data) that coincide in the time domain. In this case, UE may multiplex multiple UCI of different types on one PUCCH. Alternatively, UE may multiplex UCI on a PUSCH. Accordingly, information in different frequency domains does not have to be transmitted in one time domain, thereby effectively reducing a Peak to Average Power Ratio (PAPR) relating to UE uplink transmission and improving UE uplink transmission performance.

SUMMARY

Aspect of the present disclosure can provide a specification as to how UE transmits UCI when multiple PUCCHs overlap (i.e., partly coincide) in a time domain, or a PUCCH and a PUSCH overlap in the time domain. Further, the disclosure provides a solution as to how UE transmits a HARQ when a PUCCH for transmitting the HARQ overlaps another PUCCH or PUSCH in the time domain.

Embodiments herein provide a method, device, and system for transmitting information, and a storage medium, capable of allowing UE to transmit a HARQ when a PUCCH for transmitting the HARQ overlaps another PUCCH or PUSCH in the time domain.

According to a first aspect, a method for transmitting information can include, in response to that a first uplink resource and a second uplink resource overlap in a time domain, and that transmission of a target Hybrid Automatic Repeat Request (HARQ) is delay-able, multiplexing the target HARQ on the second uplink resource. The first uplink resource is an uplink resource allocated by a base station to User Equipment (UE) for transmitting the target HARQ. The second uplink resource is an uplink resource allocated by the base station to the UE for transmitting uplink data or target Uplink Control Information (UCI). The target UCI includes a Scheduling Request (SR) or Channel State Information (CSI). The first uplink resource is located ahead of the second uplink resource in the time domain.

Optionally, the first uplink resource may be used for transmitting multiple target HARQs. The in response to that the first uplink resource and the second uplink resource overlap in the time domain, and that transmission of the target HARQ is delay-able, multiplexing the target HARQ on the second uplink resource may further include, in response to that the first uplink resource and the second uplink resource overlap in the time domain, and that transmission of each of the multiple target HARQs is delay-able, multiplexing the multiple target HARQs on the second uplink resource.

Optionally, the in response to that the first uplink resource and the second uplink resource overlap in the time domain, and that transmission of the target HARQ is delay-able, multiplexing the target HARQ on the second uplink resource may also include, in response to that the first uplink resource and the second uplink resource overlap in the time domain, and that transmission of the target HARQ is delay-able, acquiring a maximal delay by which transmission of the target HARQ is delay-able. Additionally, the method can include, in response to that an interval between the first uplink resource and the second uplink resource in the time domain is no greater than the maximal delay, multiplexing the target HARQ on the second uplink resource.

Optionally, the method may further include, in response to that the first uplink resource and the second uplink resource overlap in the time domain, and that transmission of the target HARQ is undelay-able, multiplexing the target UCI on the first uplink resource. The method may further include determining whether transmission of the target HARQ is delay-able.

Additionally, the determining whether transmission of the target HARQ is delay-able may include receiving delay information sent by the base station, wherein the delay information indicates whether transmission of the target HARQ is delay-able, an determining, according to the delay information, whether transmission of the target HARQ is delay-able.

Optionally, the receiving the delay information sent by the base station may include receiving a system broadcast message sent by the base station. The system broadcast message may include the delay information.

The receiving the delay information sent by the base station may include: receiving Radio Resource Control (RRC) signaling sent by the base station. The RRC signaling may include the delay information.

The delay information may be a HARQ process identifier. The HARQ process identifier may identify a HARQ process to which the target HARQ belongs.

The receiving the delay information sent by the base station may include receiving first Downlink Control Information (DCI) sent by the base station. The first DCI may be configured to schedule target downlink data. The target HARQ may be configured to indicate whether the UE has received the target downlink data correctly. The first DCI may include the HARQ process identifier.

The determining, according to the delay information, whether transmission of the target HARQ is delay-able may include, in response to that the HARQ process identifier belongs to a set of target identifiers, determining that transmission of the target HARQ is delay-able, wherein each process identifier included in the set of target identifiers may identify a HARQ process in which transmission of a HARQ is delay-able, and, in response to that the HARQ process identifier does not belong to the set of target identifiers, determining that transmission of the target HARQ is undelay-able.

Optionally, the determining whether transmission of the target HARQ is delay-able may include, in response to that the UE transmits data through a mini-slot, determining that transmission of the target HARQ is undelay-able, and, in response to that the UE transmits data with a slot, determining that transmission of the target HARQ is delay-able.

Additionally, the in response to that the UE transmits the data using the mini-slot, determining that transmission of the target HARQ is undelay-able may include, in response to receiving first signaling sent by the base station, determining that transmission of the target HARQ is undelay-able.

The first signaling may be configured to indicate that the UE transmits the data using the mini-slot. The in response to that the UE transmits the data with the slot, determining that transmission of the target HARQ is delay-able may include: in response to receiving second signaling sent by the base station, determining that transmission of the target HARQ is delay-able. Further, the second signaling may be configured to indicate that the UE transmits the data with the slot.

Optionally, the in response to that the UE transmits the data using the mini-slot, determining that transmission of the target HARQ is undelay-able may include: in response to that the UE receives, on a target downlink resource, DCI configured to schedule transmission of downlink data, determining that transmission of the target HARQ is undelay-able. The target downlink resource may differ from a downlink resource on which the UE receives DCI configured to schedule downlink data transmitted with the slot.

The delay information may be a first interval indication. The first interval indication may be configured to indicate an interval between second DCI and target downlink data in the time domain. The second DCI may be configured to schedule the target downlink data. The target HARQ may be configured to indicate whether the UE has received the target downlink data correctly. The receiving the delay information sent by the base station may include: receiving the second DCI sent by the base station. The second DCI may include the first interval indication.

The determining, according to the delay information, whether transmission of the target HARQ is delay-able may include, in response to that the interval indicated by the first interval indication is no greater than a first preset interval threshold, determining that transmission of the target HARQ is undelay-able, and, in response to that the interval indicated by the first interval indication is greater than the first preset interval threshold, determining that transmission of the target HARQ is delay-able.

Optionally, the delay information may be a second interval indication. The second interval indication may be configured to indicate an interval between the target downlink data and the target HARQ in the time domain. The target HARQ may be configured to indicate whether the UE has received the target downlink data correctly.

The receiving the delay information sent by the base station may include: receiving third DCI sent by the base station. The third DCI may be configured to schedule the target downlink data. The third DCI may include the second interval indication, The determining, according to the delay information, whether transmission of the target HARQ is delay-able may include, in response to that the interval indicated by the second interval indication is no greater than a second preset interval threshold, determining that transmission of the target HARQ is undelay-able, and, in response to that the interval indicated by the second interval indication is greater than the second preset interval threshold, determining that transmission of the target HARQ is delay-able.

Optionally, the delay information may include a first interval indication and a second interval indication. The first interval indication may be configured to indicate an interval between fourth DCI and target downlink data in the time domain. The second interval indication may be configured to indicate an interval between the target downlink data and the target HARQ in the time domain. The fourth DCI may be configured to schedule the target downlink data. The target HARQ may be configured to indicate whether the UE has received the target downlink data correctly.

The receiving the delay information sent by the base station may include: receiving the fourth DCI sent by the base station. The fourth DCI may include the first interval indication and the second interval indication.

The determining, according to the delay information, whether transmission of the target HARQ is delay-able may include, in response to that a sum of the interval indicated by the first interval indication and the interval indicated by the second interval indication is no greater than a third preset interval threshold, determining that transmission of the target HARQ is undelay-able, and, in response to that the sum of the interval indicated by the first interval indication and the interval indicated by the second interval indication is greater than the third preset interval threshold, determining that transmission of the target HARQ is delay-able.

Optionally, the delay information may be a length indication. The length indication may be configured to indicate a length of target downlink data in the time domain. The target HARQ may be configured to indicate whether the UE has received the target downlink data correctly.

The receiving the delay information sent by the base station may include receiving fifth DCI sent by the base station. The fifth DCI may be configured to schedule the target downlink data. The fifth DCI may include the length indication.

The determining, according to the delay information, whether transmission of the target HARQ is delay-able may include, in response to that the length indicated by the length indication is no greater than a first preset length threshold, determining that transmission of the target HARQ is undelay-able, and, in response to that the length indicated by the length indication is greater than the first preset length threshold, determining that transmission of the target HARQ is delay-able.

Optionally, the receiving the delay information sent by the base station may include receiving sixth Downlink Control Information (DCI) sent by the base station. The sixth DCI may be configured to schedule target downlink data. The target HARQ may be configured to indicate whether the UE has received the target downlink data correctly. The sixth DCI may include the delay information. The delay information may be further configured to indicate a maximal delay by which transmission of the target HARQ is delay-able.

The first uplink resource may be a Physical Uplink Control Channel (PUCCH). The determining whether transmission of the target HARQ is delay-able may include determining a format of the PUCCH, and determining, according to the format of the PUCCH, whether transmission of the target HARQ is delay-able.

Optionally, the first uplink resource may be a Physical Uplink Control Channel (PUCCH). The determining whether transmission of the target HARQ is delay-able may include determining a length of the PUCCH in the time domain. Further, determining can include, in response to that the length of the PUCCH in the time domain is no greater than a second preset length threshold, determining that transmission of the target HARQ is undelay-able, and, in response to that the length of the PUCCH in the time domain is greater than the second preset length threshold, determining that transmission of the target HARQ is delay-able.

Optionally, the first uplink resource may be a Physical Uplink Control Channel (PUCCH). The determining whether transmission of the target HARQ is delay-able may include determining a number of sub-carriers occupied by the PUCCH in the frequency domain. Additionally, the determining can include, in response to that the number of sub-carriers occupied by the PUCCH in the frequency domain is no greater than a preset number threshold, determining that transmission of the target HARQ is delay-able, and, in response to that the number of sub-carriers occupied by the PUCCH in the frequency domain is greater than the preset number threshold, determining that transmission of the target HARQ is undelay-able.

Further, the determining whether transmission of the target HARQ is delay-able may include, in response to receiving first internal high layer signaling, determining that transmission of the target HARQ is undelay-able, wherein the first internal high layer signaling may be generated by a high layer of the UE in response to that a communication service corresponding to target downlink data is a low-delay service, wherein the target HARQ may be configured to indicate whether the UE has received the target downlink data correctly, and, in response to receiving second internal high layer signaling, determining that transmission of the target HARQ is delay-able. The second internal high layer signaling may be generated by the high layer of the UE when the communication service corresponding to the target downlink data is no low-delay service.

According to a second aspect herein, a method for transmitting information can include sending delay information to User Equipment (UE). The delay information indicates whether transmission of a target Hybrid Automatic Repeat Request (HARQ) is delay-able. The UE may be adapted to, in response to that a first uplink resource and a second uplink resource overlap in a time domain, and the delay information indicates that transmission of the target HARQ is delay-able, multiplexing the target HARQ on the second uplink resource.

The first uplink resource is an uplink resource allocated by a base station to the UE for transmitting the target HARQ. The second uplink resource is an uplink resource allocated by the base station to the UE for transmitting uplink data or target Uplink Control Information (UCI). The target UCI includes a Scheduling Request (SR) or Channel State Information (CSI). The first uplink resource is located ahead of the second uplink resource in the time domain.

Optionally, the sending the delay information to the UE may include sending a system broadcast message to the UE. The system broadcast message may include the delay information. The sending the delay information to the UE may include sending Radio Resource Control (RRC) signaling to the UE. The RRC signaling may include the delay information.

Optionally, the delay information may be a HARQ process identifier. The HARQ process identifier may identify a HARQ process to which the target HARQ belongs.

The sending the delay information to the UE may include sending first Downlink Control Information (DCI) to the UE. The first DCI may be configured to schedule target downlink data. The target HARQ may be configured to indicate whether the UE has received the target downlink data correctly. The first DCI may include the HARQ process identifier.

The HARQ process identifier may indicate that transmission of the target HARQ is delay-able when the HARQ process identifier belongs to a set of target identifiers. Each process identifier included in the set of target identifiers may identify a HARQ process in which transmission of a HARQ is delay-able. The HARQ process identifier may indicate that transmission of the target HARQ is undelay-able when the HARQ process identifier does not belong to the set of target identifiers.

Additionally, the sending the delay information to the UE may include sending sixth Downlink Control Information (DCI) to the UE. The sixth DCI may be configured to schedule target downlink data. The target HARQ may be configured to indicate whether the UE has received the target downlink data correctly. The sixth DCI may include the delay information.

Optionally, the delay information may be further configured to indicate a maximal delay by which transmission of the target HARQ is delay-able.

According to a third aspect herein, a device for transmitting information may include a first transmitting module. The first transmitting module may be adapted to, in response to that a first uplink resource and a second uplink resource overlap in a time domain, and that transmission of a target Hybrid Automatic Repeat Request (HARQ) is delay-able, multiplexing the target HARQ on the second uplink resource.

The first uplink resource may be an uplink resource allocated by a base station to User Equipment (UE) for transmitting the target HARQ. The second uplink resource may be an uplink resource allocated by the base station to the UE for transmitting uplink data or target Uplink Control Information (UCI). The target UCI may include a Scheduling Request (SR) or Channel State Information (CSI). The first uplink resource may be located ahead of the second uplink resource in the time domain.

Optionally, the first uplink resource may be used for transmitting multiple target HARQs. The first transmitting module may include a first multiplexing sub-module. The first multiplexing sub-module may be adapted to, in response to that the first uplink resource and the second uplink resource overlap in the time domain, and that transmission of each of the multiple target HARQs is delay-able, multiplexing the multiple target HARQs on the second uplink resource.

Additionally, the first transmitting module may include an acquiring sub-module and a second multiplexing sub-module. The acquiring sub-module may be adapted to, in response to that the first uplink resource and the second uplink resource overlap in the time domain, and that transmission of the target HARQ is delay-able, acquiring a maximal delay by which transmission of the target HARQ is delay-able.

The second multiplexing sub-module may be adapted to, in response to that an interval between the first uplink resource and the second uplink resource in the time domain is no greater than the maximal delay, multiplexing the target HARQ on the second uplink resource.

Optionally, the device for transmitting information may further include a second transmitting module. The second transmitting module may be adapted to, in response to that the first uplink resource and the second uplink resource overlap in the time domain, and that transmission of the target HARQ is undelay-able, multiplexing the target UCI on the first uplink resource.

The device for transmitting information may further include a determining module. The determining module may be adapted to determining whether transmission of the target HARQ is delay-able. Optionally, the determining module may include a first receiving sub-module and a first determining sub-module. The first receiving sub-module may be adapted to receiving delay information sent by the base station. The delay information may indicate whether transmission of the target HARQ is delay-able.

The first determining sub-module may be adapted to determining, according to the delay information, whether transmission of the target HARQ is delay-able.

The first receiving sub-module may be adapted to receiving a system broadcast message sent by the base station. The system broadcast message may include the delay information. Optionally, the first receiving sub-module may be adapted to receiving Radio Resource Control (RRC) signaling sent by the base station. The RRC signaling may include the delay information. The delay information may be a HARQ process identifier. The HARQ process identifier may identify a HARQ process to which the target HARQ belongs.

The first receiving sub-module may be adapted to receiving first Downlink Control Information (DCI) sent by the base station. The first DCI may be configured to schedule target downlink data. The target HARQ may be configured to indicate whether the UE has received the target downlink data correctly. The first DCI may include the HARQ process identifier.

The first determining sub-module may be adapted to, in response to that the HARQ process identifier belongs to a set of target identifiers, determining that transmission of the target HARQ is delay-able. Each process identifier included in the set of target identifiers may identify a HARQ process in which transmission of a HARQ is delay-able. The first determining sub-module may be adapted to, in response to that the HARQ process identifier does not belong to the set of target identifiers, determining that transmission of the target HARQ is undelay-able.

Optionally, the determining module may include a second determining sub-module. The second determining sub-module may be adapted to, in response to that the UE transmits data through a mini-slot, determining that transmission of the target HARQ is undelay-able; in response to that the UE transmits data with a slot, determining that transmission of the target HARQ is delay-able.

The second determining sub-module may be adapted to, in response to receiving first signaling sent by the base station, determining that transmission of the target HARQ is undelay-able. The first signaling may be configured to indicate that the UE transmits the data using the mini-slot. The second determining sub-module may be adapted to, in response to receiving second signaling sent by the base station, determining that transmission of the target HARQ is delay-able. The second signaling may be configured to indicate that the UE transmits the data with the slot.

Optionally, the second determining sub-module may be adapted to, in response to that the UE receives, on a target downlink resource, DCI configured to schedule transmission of downlink data, determining that transmission of the target HARQ is undelay-able. The target downlink resource may differ from a downlink resource on which the UE receives DCI configured to schedule downlink data transmitted with the slot.

The delay information may be a first interval indication. The first interval indication may be configured to indicate an interval between second DCI and target downlink data in the time domain. The second DCI may be configured to schedule the target downlink data. The target HARQ may be configured to indicate whether the UE has received the target downlink data correctly.

The first receiving sub-module may be adapted to receiving the second DCI sent by the base station. The second DCI may include the first interval indication. The first determining sub-module may be adapted to, in response to that the interval indicated by the first interval indication is no greater than a first preset interval threshold, determining that transmission of the target HARQ is undelay-able, and, in response to that the interval indicated by the first interval indication is greater than the first preset interval threshold, determining that transmission of the target HARQ is delay-able.

Optionally, the delay information may be a second interval indication. The second interval indication may be configured to indicate an interval between the target downlink data and the target HARQ in the time domain. The target HARQ may be configured to indicate whether the UE has received the target downlink data correctly.

The first receiving sub-module may be adapted to receiving third DCI sent by the base station. The third DCI may be configured to schedule the target downlink data. The third DCI may include the second interval indication.

The first determining sub-module may be adapted to, in response to that the interval indicated by the second interval indication is no greater than a second preset interval threshold, determining that transmission of the target HARQ is undelay-able; in response to that the interval indicated by the second interval indication is greater than the second preset interval threshold, determining that transmission of the target HARQ is delay-able.

Optionally, the delay information may include a first interval indication and a second interval indication. The first interval indication may be configured to indicate an interval between fourth DCI and target downlink data in the time domain. The second interval indication may be configured to indicate an interval between the target downlink data and the target HARQ in the time domain. The fourth DCI may be configured to schedule the target downlink data. The target HARQ may be configured to indicate whether the UE has received the target downlink data correctly.

The first receiving sub-module may be adapted to receiving the fourth DCI sent by the base station. The fourth DCI may include the first interval indication and the second interval indication.

The first determining sub-module may be adapted to, in response to that a sum of the interval indicated by the first interval indication and the interval indicated by the second interval indication is no greater than a third preset interval threshold, determining that transmission of the target HARQ is undelay-able, and, in response to that the sum of the interval indicated by the first interval indication and the interval indicated by the second interval indication is greater than the third preset interval threshold, determining that transmission of the target HARQ is delay-able.

Optionally, the delay information may be a length indication. The length indication may be configured to indicate a length of target downlink data in the time domain. The target HARQ may be configured to indicate whether the UE has received the target downlink data correctly.

The first receiving sub-module may be adapted to receiving fifth DCI sent by the base station. The fifth DCI may be configured to schedule the target downlink data. The fifth DCI may include the length indication.

The first determining sub-module may be adapted to, in response to that the length indicated by the length indication is no greater than a first preset length threshold, determining that transmission of the target HARQ is undelay-able, and, in response to that the length indicated by the length indication is greater than the first preset length threshold, determining that transmission of the target HARQ is delay-able.

Optionally, the first receiving sub-module may be adapted to receiving sixth Downlink Control Information (DCI) sent by the base station. The sixth DCI may be configured to schedule target downlink data. The target HARQ may be configured to indicate whether the UE has received the target downlink data correctly. The sixth DCI may include the delay information. The delay information may be further configured to indicate a maximal delay by which transmission of the target HARQ is delay-able.

Optionally, the first uplink resource may be a Physical Uplink Control Channel (PUCCH). The determining module may include a first determining sub-module and a third determining sub-module. The first determining sub-module may be adapted to determining a format of the PUCCH. The third determining sub-module may be adapted to determining, according to the format of the PUCCH, whether transmission of the target HARQ is delay-able.

Optionally, the first uplink resource may be a Physical Uplink Control Channel (PUCCH). The determining module may include a second determining sub-module and a fourth determining sub-module. The second determining sub-module may be adapted to determining a length of the PUCCH in the time domain.

The fourth determining sub-module may be adapted to, in response to that the length of the PUCCH in the time domain is no greater than a second preset length threshold, determining that transmission of the target HARQ is undelay-able, and, in response to that the length of the PUCCH in the time domain is greater than the second preset length threshold, determining that transmission of the target HARQ is delay-able.

Optionally, the first uplink resource may be a Physical Uplink Control Channel (PUCCH). The determining module may include a third determining sub-module and a fifth determining sub-module. The third determining sub-module may be adapted to determining a number of sub-carriers occupied by the PUCCH in the frequency domain.

The fifth determining sub-module may be adapted to, in response to that the number of sub-carriers occupied by the PUCCH in the frequency domain is no greater than a preset number threshold, determining that transmission of the target HARQ is delay-able, and, in response to that the number of sub-carriers occupied by the PUCCH in the frequency domain is greater than the preset number threshold, determining that transmission of the target HARQ is undelay-able.

Optionally, the determining module may include a sixth determining sub-module. The sixth determining sub-module may be adapted to, in response to receiving first internal high layer signaling, determining that transmission of the target HARQ is undelay-able. The first internal high layer signaling may be generated by a high layer of the UE when a communication service corresponding to target downlink data is a low-delay service. The target HARQ may be configured to indicate whether the UE has received the target downlink data correctly. The sixth determining sub-module may be adapted to, in response to receiving second internal high layer signaling, determining that transmission of the target HARQ is delay-able. The second internal high layer signaling may be generated by the high layer of the UE when the communication service corresponding to the target downlink data is no low-delay service.

According to a fourth aspect herein, a device for transmitting information may include a sending module. The sending module can be adapted to sending delay information to User Equipment (UE). The delay information indicates whether transmission of a target Hybrid Automatic Repeat Request (HARQ) is delay-able. The UE may be adapted to, in response to that a first uplink resource and a second uplink resource overlap in a time domain, and the delay information indicates that transmission of the target HARQ is delay-able, multiplexing the target HARQ on the second uplink resource.

The first uplink resource is an uplink resource allocated by a base station to the UE for transmitting the target HARQ. The second uplink resource is an uplink resource allocated by the base station to the UE for transmitting uplink data or target Uplink Control Information (UCI). The target UCI includes a Scheduling Request (SR) or Channel State Information (CSI). The first uplink resource is located ahead of the second uplink resource in the time domain.

Optionally, the sending module may include a first sending sub-module. The first sending sub-module may be adapted to sending a system broadcast message to the UE. The system broadcast message may include the delay information.

Additionally, the sending module may include a second sending sub-module. The second sending sub-module may be adapted to sending Radio Resource Control (RRC) signaling to the UE. The RRC signaling may include the delay information. The delay information may be a HARQ process identifier. The HARQ process identifier may identify a HARQ process to which the target HARQ belongs. The sending module may include a third sending sub-module.

The third sending sub-module may be adapted to sending first Downlink Control Information (DCI) to the UE. The first DCI may be configured to schedule target downlink data. The target HARQ may be configured to indicate whether the UE has received the target downlink data correctly. The first DCI may include the HARQ process identifier.

The HARQ process identifier may indicate that transmission of the target HARQ is delay-able when the HARQ process identifier belongs to a set of target identifiers. Each process identifier included in the set of target identifiers may identify a HARQ process in which transmission of a HARQ is delay-able. The HARQ process identifier may indicate that transmission of the target HARQ is undelay-able when the HARQ process identifier does not belong to the set of target identifiers.

Optionally, the sending module may include a fourth sending sub-module. The fourth sending sub-module may be adapted to sending sixth Downlink Control Information (DCI) to the UE. The sixth DCI may be configured to schedule target downlink data. The target HARQ may be configured to indicate whether the UE has received the target downlink data correctly. The sixth DCI may include the delay information.

Optionally, the delay information may be further configured to indicate a maximal delay by which transmission of the target HARQ is delay-able.

According to a fifth aspect herein, a device for transmitting information may include a processor and memory. The memory is adapted to storing an instruction executable by the processor. The processor can be adapted to, in response to that a first uplink resource and a second uplink resource overlap in a time domain, and that transmission of a target Hybrid Automatic Repeat Request (HARQ) is delay-able, multiplexing the target HARQ on the second uplink resource.

The first uplink resource is an uplink resource allocated by a base station to User Equipment (UE) for transmitting the target HARQ. The second uplink resource is an uplink resource allocated by the base station to the UE for transmitting uplink data or target Uplink Control Information (UCI). The target UCI includes a Scheduling Request (SR) or Channel State Information (CSI). The first uplink resource is located ahead of the second uplink resource in the time domain.

According to a sixth aspect herein, a device for transmitting information may include a processor and memory. The memory can be adapted to storing an instruction executable by the processor. The processor is adapted to sending delay information to User Equipment (UE). The delay information indicates whether transmission of a target Hybrid Automatic Repeat Request (HARQ) is delay-able.

The UE is adapted to, in response to that a first uplink resource and a second uplink resource overlap in a time domain, and the delay information indicates that transmission of the target HARQ is delay-able, multiplexing the target HARQ on the second uplink resource.

The first uplink resource is an uplink resource allocated by a base station to the UE for transmitting the target HARQ. The second uplink resource is an uplink resource allocated by the base station to the UE for transmitting uplink data or target Uplink Control Information (UCI). The target UCI includes a Scheduling Request (SR) or Channel State Information (CSI). The first uplink resource is located ahead of the second uplink resource in the time domain.

According to a seventh aspect herein, a system for transmitting information may include the device for transmitting information according to the third aspect herein and the device for transmitting information according to the fourth aspect herein.

According to an eighth aspect herein, a computer-readable storage medium has stored thereon a computer program which, when executed by a processing component, allows the processing component to implement the method according to the first aspect herein, or the method according to the second aspect herein.

The technical solution provided by embodiments herein includes beneficial effects. For example, when a first uplink resource and a second uplink resource overlap in a time domain, and transmission of a target Hybrid Automatic Repeat Request (HARQ) is delay-able, the target HARQ is multiplexed on the second uplink resource. Accordingly, UE is allowed to transmit a HARQ when a PUCCH for transmitting the HARQ overlaps another PUCCH or PUSCH in the time domain.

The above general description and detailed description below are but exemplary and explanatory, and do not limit the subject disclosure.

BRIEF DESCRIPTION OF THE ACCOMPANYING DRAWINGS

Drawings for describing embodiments herein are introduced below briefly for clearer illustration of a technical solution of exemplary embodiments herein. Note that the drawings described below refer merely to some exemplary embodiments herein. A person having ordinary skill in the art may acquire other drawings according to the drawings herein.

FIG. 2 is a flowchart of a method for transmitting information according to an exemplary embodiment.

FIG. 3 is a flowchart of a method for transmitting information according to an exemplary embodiment.

DETAILED DESCRIPTION

Figure 1:
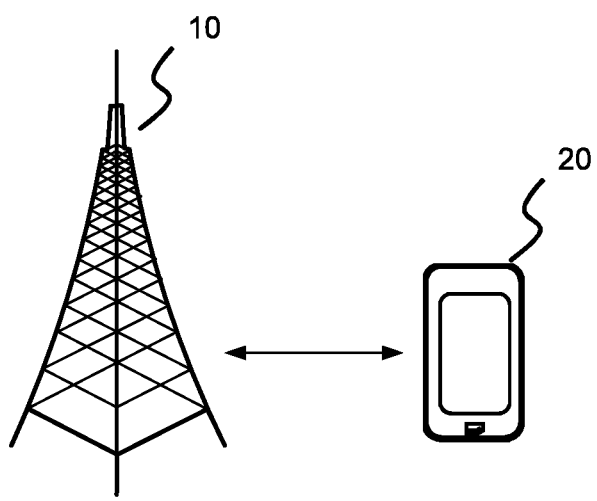
FIG. 1 is a diagram of an environment of implementation according to an exemplary embodiment.

To clearly show a technical problem to be solved, a technical solution, and beneficial effects herein, implementation of the subject disclosure is further elaborated below with reference to the drawings and embodiments.

Exemplary embodiments (examples of which are illustrated in the accompanying drawings) are elaborated below. The following description refers to the accompanying drawings, in which identical or similar elements in two drawings are denoted by identical reference numerals unless indicated otherwise. Of course, implementations set forth in the following exemplary embodiments do not represent all implementations in accordance with the subject disclosure. Rather, they are mere examples of the apparatus (i.e., device) and method in accordance with certain aspects of the subject disclosure as recited in the accompanying claims.

In a wireless communication system, User Equipment (UE) may have to report Uplink Control Information (UCI) to a base station. UCI may include a Hybrid Automatic Repeat Request (HARQ), a Scheduling Request (SR), Channel State Information (CSI), and the like.

In general, UE may send UCI to a base station through a Physical Uplink Control Channel (PUCCH). A base station may configure, through Radio Resource Control (RRC) signaling, a PUCCH used by UE for transmitting SR and CSI. As to a HARQ, a base station may configure one or more groups of PUCCH resources. UE may dynamically select a PUCCH in a group of PUCCH resources for transmitting the HARQ according to an indication sent by the base station.

In related art, a base station may configure, for UE, multiple PUCCHs (for transmitting different types of UCI) that coincide in a time domain. Then, UE may multiplex multiple UCI of different types on one PUCCH. That is, UE may code multiple UCI of different types, and transmit coded UCI on one PUCCH. For example, a base station may allocate, to UE, a first PUCCH for transmitting a HARQ. The base station may allocated, to the UE, a second PUCCH for transmitting CSI. The first PUCCH and the second PUCCH may coincide in the time domain. That is, the first PUCCH and the second PUCCH may occupy an identical resource in the time domain. Then, UE may code the CSI and the HARQ that should have been transmitted using the first PUCCH, and transmit the coded information using the second PUCCH.

A base station may configure, for UE, a PUCCH for transmitting UCI and a Physical Uplink Shared Channel (PUSCH) for transmitting uplink data. The PUCCH may coincide the PUSCH in the time domain. Then, UE may multiplex UCI on the PUSCH. That is, the UE may code the UCI and the uplink data, and transmit the coded information using the PUSCH. For example, a base station may allocate, to UE, a first PUCCH for transmitting a HARQ and a PUSCH for transmitting uplink data. The first PUCCH may coincide the PUSCH in the time domain. That is, the first PUCCH and the PUSCH may occupy an identical resource in the time domain. Then, the UE may code the uplink data and the HARQ that should have been transmitted using the first PUCCH, and transmit the coded information using the PUSCH.

Accordingly, UE does not have to transmit, in one time domain, information in different frequency domains, thereby effectively reducing a Peak to Average Power Ratio (PAPR) relating to UE uplink transmission, improving UE uplink transmission performance.

However, so far there has been no specification as to how UE transmits UCI when multiple PUCCHs overlap in a time domain, or a PUCCH and a PUSCH overlap in the time domain. In particular, there is a need for a solution as to how UE transmits a HARQ when a PUCCH for transmitting the HARQ overlaps another PUCCH or PUSCH in the time domain.

Embodiments herein provide a method for transmitting information, capable of allowing UE to transmit a HARQ when a PUCCH for transmitting the HARQ overlaps another PUCCH or PUSCH in the time domain. According to an embodiment herein, an environment of implementing the method for transmitting information may be described below. As shown in FIG. 1, the environment of implementation may include a base station 10 and UE 20. The base station 10 may be connected to the UE 20 through a communication network. The UE 20 may be any UE in a cell served by the base station 10. The communication network may be a Long Term Evolution (LTE) communication network. The Fifth Generation Mobile Communication Technology (5G) communication network, or another communication network similar to the LTE communication network or the 5G communication network.

FIG. 2 is a flowchart of a method for transmitting information according to an exemplary embodiment. The method for transmitting information is applicable to the UE 20 as shown in FIG. 1. As shown in FIG. 2, the method for transmitting information may include a step as follows.

In step 201, when a first uplink resource and a second uplink resource overlap in a time domain, and transmission of a target Hybrid Automatic Repeat Request (HARQ) is delay-able, UE multiplexes the target HARQ on the second uplink resource.

The first uplink resource is an uplink resource allocated by a base station to User Equipment (UE) for transmitting the target HARQ. The second uplink resource is an uplink resource allocated by the base station to the UE for transmitting uplink data or target Uplink Control Information (UCI). The target UCI includes a Scheduling Request (SR) or Channel State Information (CSI). The first uplink resource is located ahead of the second uplink resource in the time domain.

In short, with embodiments herein, information is transmitted by multiplexing the target HARQ on the second uplink resource when the first uplink resource and the second uplink resource overlap in the time domain and transmission of the target HARQ is delay-able. Accordingly, UE is allowed to transmit a HARQ when a PUCCH for transmitting the HARQ overlaps another PUCCH or PUSCH in the time domain.

FIG. 3 is a flowchart of a method for transmitting information according to an exemplary embodiment. The method for transmitting information is applicable to a base station 10 as shown in FIG. 1. As shown in FIG. 3, the method for transmitting information may include a step as follows.

In step 301, a base station sends delay information to User Equipment (UE). The delay information indicates whether transmission of a target Hybrid Automatic Repeat Request (HARQ) is delay-able. The UE is adapted to, in response to that a first uplink resource and a second uplink resource overlap in a time domain, and the delay information indicates that transmission of the target HARQ is delay-able, multiplexing the target HARQ on the second uplink resource.

The first uplink resource is an uplink resource allocated by a base station to the UE for transmitting the target HARQ. The second uplink resource is an uplink resource allocated by the base station to the UE for transmitting uplink data or target Uplink Control Information (UCI). The target UCI includes a Scheduling Request (SR) or Channel State Information (CSI). The first uplink resource is located ahead of the second uplink resource in the time domain.

In short, with embodiments herein, information is transmitted as follows. A base station may send, to UE, delay information indicating whether transmission of a target HARQ is delay-able. In this way, the UE may multiplex the target HARQ on the second uplink resource when the first uplink resource and the second uplink resource overlap in the time domain and delay information indicates that transmission of the target HARQ is delay-able. Accordingly, UE is allowed to transmit a HARQ when a PUCCH for transmitting the HARQ overlaps another PUCCH or PUSCH in the time domain.

Figure 4:
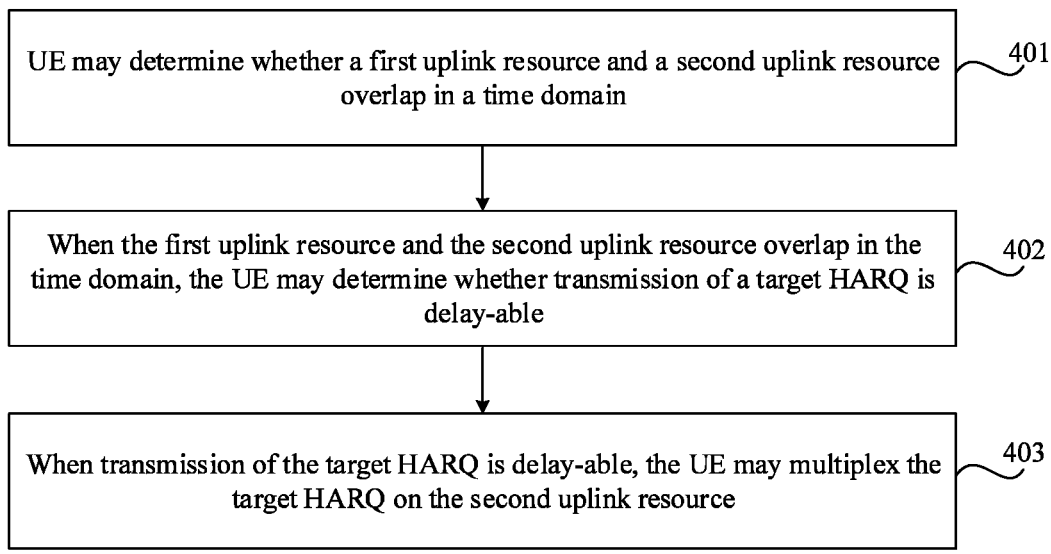
FIG. 4 is a flowchart of a method for transmitting information according to an exemplary embodiment.

FIG. 4 is a flowchart of a method for transmitting information according to an exemplary embodiment. The method for transmitting information is applicable to the environment of implementation as shown in FIG. 1. As shown in FIG. 4, the method for transmitting information may include a step as follows.

In step 401, UE may determine whether a first uplink resource overlaps a second uplink resource in a time domain. A first uplink resource may be an uplink resource allocated by a base station to UE for transmitting a target HARQ. A target HARQ may be configured to indicate whether UE has correctly received target downlink data sent by a base station. Optionally, a first uplink resource may be a PUCCH. As mentioned above, a base station may configure one or more groups of PUCCH resources for transmitting a HARQ. A base station may instruct UE dynamically. The UE may determine, according to the instruction/indication sent by the base station, a PUCCH in a group of PUCCH resources as the first uplink resource the base station allocates to the UE.

A second uplink resource may be an uplink resource allocated by a base station to UE for transmitting uplink data or target UCI. A target UCI may include an SR or CSI. Optionally, a second uplink resource may be a resource for transmitting uplink data. Then, the second uplink resource may be a PUSCH. A second uplink resource may be a resource for transmitting target UCI. Then, the second uplink resource may be a PUCCH. When a second uplink resource is a PUCCH, a base station may allocate the second uplink resource to UE through RRC signaling. When a second uplink resource is a PUSCH, a base station may allocate the second uplink resource to UE by request of the UE.

According to an embodiment herein, the first uplink resource may be located ahead of the second uplink resource in the time domain. That is, a first symbol occupied by the first uplink resource may be located ahead of a first symbol occupied by the second uplink resource in the time domain.

By saying that the first uplink resource and the second uplink resource overlap in the time domain, it means that a time domain resource occupied by the first uplink resource and a time domain resource occupied by the second uplink resource are partially the same. For example, a time domain resource occupied by the first uplink resource may be a slot a, a slot b, and a slot c. A time domain resource occupied by the second uplink resource may be the slot c and a slot d. Then, part of the time domain resource occupied by the first uplink resource is identical to part of the time domain resource occupied by the second uplink resource, with the identical part being the slot c. Then, the first uplink resource and the second uplink resource overlap in the time domain.

Optionally, UE may determine, through a configuration of a first uplink resource and a second uplink resource by a base station, whether the first uplink resource overlaps the second uplink resource in the time domain.

In step 402, when a first uplink resource and a second uplink resource overlap in the time domain, UE may determine whether transmission of a target HARQ is delay-able. When a first uplink resource and a second uplink resource overlap in the time domain, UE may multiplex a target HARQ and uplink data, or a target HARQ and target UCI, on one of the first uplink resource or the second uplink resource. Accordingly, information in different frequency domains does not have to be transmitted in one time domain, thereby further reducing a PAPR relating to UE uplink transmission, improving UE uplink transmission performance.

To multiplex a target HARQ and uplink data, or the target HARQ and target UCI, on an uplink resource, UE may have to determine whether transmission of a target HARQ is delay-able, in order to determine subsequently according to a result of the determination, whether to multiplex the target HARQ and the uplink data, or the target HARQ and the target UCI, on the first uplink resource or the second uplink resource. This is because in general, a base station may continue to send remaining downlink data of a communication service to UE only after receiving a HARQ sent by the UE directed at certain downlink data and determining, according to the HARQ, that the UE has received the certain downlink data correctly. Therefore, if there is a significant delay when UE feeds a HARQ back to a base station, there may be a significant delay when the base station sends downlink data to the UE, which is unacceptable for a delay-sensitive communication service. Therefore, before multiplexing, UE may have to determine whether transmission of a target HARQ is delay-able, in order to determine subsequently according to a result of the determination, whether to multiplex the target HARQ and uplink data, or the target HARQ and target UCI, on a first uplink resource or a second uplink resource.

It should be noted that the first uplink resource may be used for transmitting multiple target HARQs. Each target HARQ may correspond to certain target downlink data. The each target HARQ may be configured to indicate whether the certain target downlink data are received correctly by UE. In this case, before multiplexing, the UE may have to determine whether transmission of the each target HARQ is delay-able.

According to embodiments herein, there may be four options for UE to determine whether transmission of a target HARQ is delay-able. The four options may be described below one by one according to an embodiment herein.

In the first option, UE may receive delay information sent by a base station. The UE may determine, according to the delay information, whether transmission of the target HARQ is delay-able.

In application, a base station may send the delay information in different modes. With embodiments herein, there may be 3 options for a base station to send delay information.

In option 1, a base station may send delay information through a system broadcast message. A base station may broadcast a system broadcast message. The system broadcast message may include delay information. The delay information may indicate, explicitly or implicitly, whether transmission of a target HARQ is delay-able. UE may receive the system broadcast message. The UE may determine, according to indication of the delay information in the system broadcast message, whether transmission of the target HARQ is delay-able.

In option 2, a base station may send delay information through RRC signaling. A base station may send RRC signaling to UE. The RRC signaling may include delay information. Likewise, the delay information may indicate, explicitly or implicitly, whether transmission of a target HARQ is delay-able. A base station may indicate semi-statically through the RRC signaling, whether transmission of the target HARQ is delay-able. The UE may receive the RRC signaling sent by the base station. The UE may determine, according to indication of the delay information in the RRC signaling, whether transmission of the target HARQ is delay-able.

In option 3, a base station may send delay information through DCI. According to a possible implementation, the delay information may be a HARQ process identifier. A base station may send the HARQ process identifier to UE through first DCI. The first DCI may be configured to schedule the target downlink data. The first DCI may include the HARQ process identifier. The HARQ process identifier included in the first DCI may identify a HARQ process to which the target HARQ belongs.

UE may be configured with multiple (up to 16) HARQ processes. The UE may transmit multiple HARQs in parallel through the multiple HARQs processes configured. Each HARQ process may be identified by a unique HARQ process identifier. A base station may send a set of target identifiers to the UE through RRC signaling. The set of target identifiers may or may not be a null set. When not null, the set of target identifiers may include at least one process identifier. Each process identifier may identify a HARQ process in which transmission of a HARQ is delay-able. The UE may determine whether transmission of the target HARQ is delay-able by determining whether the HARQ process identifier included in the first DCI belongs to the set of target identifiers. When the HARQ process identifier included in the first DCI belongs to the set of target identifiers, the UE may determine that transmission of the target HARQ is delay-able. When the HARQ process identifier included in the first DCI does not belong to the set of target identifiers, the UE may determine that transmission of the target HARQ is undelay-able.

According to a possible implementation, the delay information may be a first interval indication. A base station may send the first interval indication to UE through second DCI. The second DCI may be configured to schedule the target downlink data. The second DCI may include the first interval indication. The first interval indication may be configured to indicate an interval between the second DCI and the target downlink data in the time domain.

For a delay-sensitive communication service (such as a highly reliable low-delay service), there may often be a small interval between DCI for scheduling downlink data and the downlink data being scheduled.

Therefore, when the interval indicated by the first interval indication is no greater than a first preset interval threshold, it is highly possible that target downlink data scheduled by the second DCI are of a delay-sensitive communication service. In this case, to meet the requirement of the communication service for a low delay, delayed transmission of the target HARQ may generally be not allowed. Therefore, in this case, the UE may determine that transmission of the target HARQ is undelay-able.

When the interval indicated by the first interval indication is greater than the first preset interval threshold, it is highly possible that target downlink data scheduled by the second DCI are not of a delay-sensitive communication service. In this case, delayed transmission of the target HARQ may generally be allowable. Therefore, in this case, the UE may determine that transmission of the target HARQ is delay-able.

It should be noted that when the first uplink resource is used for transmitting multiple target HARQs, UE may acquire a first interval indication corresponding to each target HARQ. Then, the UE may determine, among the multiple first interval indications acquired, a maximal first interval indication and a minimal first interval indication. The maximal first interval indication may indicate a maximal interval. The minimal first interval indication may indicate a minimal interval. The UE may determine whether the interval indicated by the maximal first interval indication is no greater than the first preset interval threshold. When the interval indicated by the maximal first interval indication is no greater than the first preset interval threshold, the UE may determine that transmission of each of the multiple target HARQs is undelay-able. The UE may determine whether the interval indicated by the minimal first interval indication is greater than the first preset interval threshold. When the interval indicated by the minimal first interval indication is greater than the first preset interval threshold, the UE may determine that transmission of each of the multiple target HARQs is delay-able.

Further note that the first preset interval threshold may be configured by a base station, specified by a communication protocol, configured by a high layer of the UE, etc. A high layer of the UE may be a Media Access Control (MAC) layer or an RRC layer of the UE, etc., where no specific limit thereto is set with embodiments herein.

In application, the first interval indication may be located in a time domain resource domain allocated to the second DCI. The first interval indication may occupy three bits. The first interval indication may indicate 8 different intervals in the time domain. The time-domain interval may be in units of slots. For example, the first interval indication may indicate an interval of 1 slot, 2 slots, 5 slots, etc.

According to a possible implementation, the delay information may be a second interval indication. A base station may send the second interval indication to UE through third DCI. The third DCI may be configured to schedule the target downlink data. The third DCI may include the second interval indication. The second interval indication may be configured to indicate the interval between the target downlink data and the target HARQ in the time domain.

For a delay-sensitive communication service, there may often be a small interval between downlink data and a HARQ in the time domain. The HARQ may be configured to indicate whether the downlink data have been received by UE correctly.

Therefore, when the interval indicated by the second interval indication is no greater than a second preset interval threshold, it is highly possible that target downlink data scheduled by the third DCI are of a delay-sensitive communication service. In this case, to meet the requirement of the communication service for a low delay, delayed transmission of the target HARQ may generally be not allowed. Therefore, in this case, the UE may determine that transmission of the target HARQ is undelay-able.

When the interval indicated by the second interval indication is greater than the second preset interval threshold, it is highly possible that target downlink data scheduled by the third DCI are not of a delay-sensitive communication service. In this case, delayed transmission of the target HARQ may generally be allowable. Therefore, in this case, the UE may determine that transmission of the target HARQ is delay-able.

Note that when the first uplink resource is used for transmitting multiple target HARQs, UE may acquire a second interval indication corresponding to each target HARQ. Then, the UE may determine, among the multiple second interval indications acquired, a maximal second interval indication and a minimal second interval indication. The maximal second interval indication may indicate a maximal interval. The minimal second interval indication may indicate a minimal interval. The UE may determine whether the interval indicated by the maximal second interval indication is no greater than the second preset interval threshold. When the interval indicated by the maximal second interval indication is no greater than the second preset interval threshold, the UE may determine that transmission of each of the multiple target HARQs is undelay-able. The UE may determine whether the interval indicated by the minimal second interval indication is greater than the second preset interval threshold. When the interval indicated by the minimal second interval indication is greater than the second preset interval threshold, the UE may determine that transmission of each of the multiple target HARQs is delay-able.

Further note that the second preset interval threshold may be configured by a base station, specified by a communication protocol, configured by a high layer of the UE, etc. A high layer of the UE may be a Media Access Control (MAC) layer or an RRC layer of the UE, and the like, where no specific limit thereto is set with embodiments herein.

In application, the second interval indication may occupy two bits. The second interval indication may indicate 4 different intervals in the time domain. The time-domain interval may be in units of slots. That is, the second interval indication may be configured to indicate a number of slots spanning the slot of the last symbol occupied by the target downlink data and the slot of the first symbol occupied by the target HARQ.

According to a possible implementation, the delay information may include both the first interval indication and the second interval indication. A base station may send the first interval indication and the second interval indication to UE through fourth DCI. The fourth DCI may be configured to schedule the target downlink data. The fourth DCI may include the first interval indication and the second interval indication, wherein the first interval indication may be configured to indicate the interval between the fourth DCI and the target downlink data in the time domain. The second interval indication may be configured to indicate the interval between the target downlink data and the target HARQ in the time domain.

The UE may determine whether transmission of the target HARQ is delay-able according to a sum of the interval indicated by the first interval indication and the interval indicated by the second interval indication. Optionally, when the sum of the interval indicated by the first interval indication and the interval indicated by the second interval indication is no greater than a third preset interval threshold, the UE may determine that transmission of the target HARQ is undelay-able. When the sum of the interval indicated by the first interval indication and the interval indicated by the second interval indication is greater than the third preset interval threshold, the UE may determine that transmission of the target HARQ is delay-able.

It should be noted that when the first uplink resource is used for transmitting multiple target HARQs, the UE may acquire the sum of the interval indicated by the second interval indication and the interval indicated by the first interval indication corresponding to each target HARQ. Then, UE may determine, among multiple sums acquired, a maximal sum and a minimal sum. The UE may determine whether the maximal sum is no greater than the third preset interval threshold. When the maximal sum is no greater than the third preset interval threshold, the UE may determine that transmission of each of the multiple target HARQs is undelay-able. The UE may determine whether the minimal sum is greater than the third preset interval threshold. When the minimal sum is greater than the third preset interval threshold, the UE may determine that transmission of each of the multiple target HARQs is delay-able.

According to a possible implementation, the delay information may be a length indication. A base station may send the length indication to UE through the fifth DCI. The fifth DCI may be configured to schedule the target downlink data. The fifth DCI may include the length indication. The length indication may be configured to indicate a length of the target downlink data in the time domain.

For a delay-sensitive communication service, downlink data may often have a small length in the time domain. Therefore, when the length indicated by the length indication is no greater than a first preset length threshold, it is highly possible that target downlink data scheduled by the fifth DCI are of a delay-sensitive communication service. In this case, to meet the requirement of the communication service for a low delay, delayed transmission of the target HARQ may generally be not allowed. Therefore, in this case, the UE may determine that transmission of the target HARQ is undelay-able.

When the length indicated by the length indication is greater than the first preset length threshold, it is highly possible that target downlink data scheduled by the fifth DCI are not of a delay-sensitive communication service. In this case, delayed transmission of the target HARQ may generally be allowable. Therefore, in this case, the UE may determine that transmission of the target HARQ is delay-able.

It should be noted that the first preset interval threshold may be configured by a base station, specified by a communication protocol, configured by a high layer of the UE, etc. A high layer of the UE may be a Media Access Control (MAC) layer or an RRC layer of the UE, and the like, where no specific limit thereto is set with embodiments herein.

According to a possible implementation, a base station may send delay information to UE through sixth DCI. The sixth DCI may be configured to schedule the target downlink data. The sixth DCI may include the delay information. The delay information may indicate explicitly whether transmission of the target HARQ is delay-able. For example, the delay information may occupy one bit. Delay information of "1" may indicate that transmission of the target HARQ is delay-able. Delay information of "0" may indicate that transmission of the target HARQ is undelay-able.

Optionally, in the implementation, the delay information may further indicate a maximal delay by which transmission of the target HARQ is delay-able. For example, the delay information may occupy two bits. Delay information of "00" may indicate that transmission of the target HARQ is undelay-able. Delay information of "01" may indicate that transmission of the target HARQ is delay-able, by a maximal delay of A1. Delay information of "10" may indicate that transmission of the target HARQ is delay-able, by a maximal delay of A2. Correspondence between delay information and the maximal delay may be configured by a base station, specified by a communication protocol, etc.

Of course, other delay information according to embodiments herein may as well indicate the maximal delay by which transmission of the target HARQ is delay-able. For example, any delay information included in a system broadcast message, in RRC signaling, etc., may indicate the maximal delay by which transmission of the target HARQ is delay-able. Plus, a base station may send a separate delay indication to UE to indicate the maximal delay by which transmission of the target HARQ is delay-able.

Subsequently, the UE may determine, according to a size of a maximal delay, whether to multiplex the target HARQ and the uplink data, or the target HARQ and the target UCI, on the first uplink resource or the second uplink resource. Optionally, an interval between the first uplink resource and the second uplink resource in the time domain may be no greater than the maximal delay. Then, the UE may select to multiplex on the second uplink resource. The interval between the first uplink resource and the second uplink resource in the time domain may be greater than the maximal delay. Then, the UE may select to multiplex on the first uplink resource.

An interval between the first uplink resource and the second uplink resource in the time domain may refer to the interval between the first symbol of the first uplink resource and the first symbol of the second uplink resource in the time domain, or the interval between the last symbol of the first uplink resource and the last symbol of the second uplink resource in the time domain.

In the second option, UE may determine whether transmission of a target HARQ is delay-able through a time domain resource unit with which data are transmitted.

In a 5G communication system, communication data of a delay-sensitive communication service may generally have to be transmitted based on a mini-slot. A mini-slot may include 2, 4, or 7 symbols. Therefore, when UE transmits data through a mini-slot, it is highly possible that the data transmitted by the UE are of a delay-sensitive communication service. In this case, transmission of a target HARQ may not be delayed. When UE transmits data with a slot, it is highly possible that the data transmitted by the UE are not of a delay-sensitive communication service. In this case, transmission of the target HARQ is delay-able.

Optionally, UE may determine, in a mode as follows, whether to transmit data based on a mini-slot.

In mode 1, UE may determine, based on a configuration by a base station, whether to transmit data based on a mini-slot.

When receiving first signaling sent by a base station, UE may determine to transmit data based on a mini-slot. In this case, the UE may determine that transmission of a target HARQ is undelay-able. The first signaling may be configured to signal UE to transmit data through a mini-slot. The first signaling may be RRC signaling.

When receiving second signaling sent by a base station, UE may determine to transmit data based on a slot. In this case, the UE may determine that transmission of a target HARQ is delay-able. The second signaling may be configured to signal UE to transmit data with a slot. The second signaling may be RRC signaling, too.

In mode 2, UE may determine, based on a time-frequency location where DCI is received, whether to transmit data based on a mini-slot.

When receiving, on a target downlink resource, DCI configured to schedule transmission of downlink data, UE may determine that transmission of a target HARQ is undelay-able. The target downlink resource may differ from a downlink resource on which the UE receives the DCI scheduling the downlink data transmitted with a slot.

In general, when transmitting data based on a slot, UE may receive DCI only in a control domain of the slot (a time-frequency location where the UE receives the DCI scheduling the downlink data transmitted with the slot). A control domain of a slot may generally include a first number of (such as first 3) symbols in the slot. Therefore, when UE receives DCI on a downlink resource other than a control domain of a slot (such as symbols in the middle part of the slot), it may mean that the UE transmits data based on a mini-slot. In this case, the UE may determine that transmission of a target HARQ is undelay-able.

In mode 3, UE may determine, through a property of a first uplink resource, whether transmission of a target HARQ is delay-able.

As mentioned above, a first uplink resource may be a PUCCH. According to a possible implementation, the UE may determine, according to a format of the first uplink resource (PUCCH), whether transmission of the target HARQ is delay-able.

In general, UCI transmitted by PUCCHs of different formats may be of different types, and may occupy different numbers of bits. For example, in an LTE communication system, a PUCCH may be of a format 1, 1a, 1b, 2, 2a, 2b, etc. A PUCCH of the format 1a may be used for transmitting a HARQ, and may occupy 1 bit. A PUCCH of the format 1b may as well be used for transmitting a HARQ, but may occupy 2 bit. To date, a protocol for a 5G communication system specifies a format of a PUCCH in a new-generation mobile communication system, for example communication standard 3GPP TS 38.211-38.215. A PUCCH of a certain format, such as format 0, format 2, etc., may be configured to transmit data of a delay-sensitive communication service, while a PUCCH of a certain format, such as format 1, format 3, format 4, etc., may be configured to transmit data of a delay-insensitive communication service. Therefore, the UE may determine, according to a format of the first uplink resource, whether transmission of the target HARQ is delay-able. Optionally, when a format of the first uplink resource is a PUCCH format configured to transmit data of a delay-sensitive communication service, the UE may determine that transmission of the target HARQ is undelay-able. When a format of the first uplink resource is a PUCCH format configured to transmit data of a delay-insensitive communication service, the UE may determine that transmission of the target HARQ is delay-able.

According to a possible implementation, UE may determine, according to a length of the first uplink resource (PUCCH) in the time domain, whether transmission of the target HARQ is delay-able.

When the length of the PUCCH in the time domain is small, the PUCCH may generally be configured to transmit data of a delay-sensitive communication service. For example, when the PUCCH occupies 2 symbols in the time domain, the PUCCH may be configured to transmit data of a delay-sensitive communication service. When the length of the PUCCH in the time domain is large, the PUCCH may generally be configured to transmit data of a delay-insensitive communication service. For example, when the PUCCH occupies 4 symbols in the time domain, the PUCCH may be configured to transmit data of a delay-insensitive communication service.

Therefore, the UE may determine, according to the length of the first uplink resource in the time domain, whether transmission of the target HARQ is delay-able. Optionally, when the length of the first uplink resource in the time domain is no greater than a second preset length threshold, the UE may determine that transmission of the target HARQ is undelay-able. When the length of the first uplink resource in the time domain is greater than the second preset length threshold, the UE may determine that transmission of the target HARQ is delay-able.

It should be noted that the second preset length threshold may be configured by a base station, specified by a communication protocol, configured by a high layer of the UE, etc. A high layer of the UE may be a Media Access Control (MAC) layer or an RRC layer of the UE, and the like, where no specific limit thereto is set with embodiments herein.

According to a possible implementation, UE may determine, according to a number of sub-carriers occupied by the first uplink resource (PUCCH) in the frequency domain, whether transmission of the target HARQ is delay-able. Different PUCCHs may generally occupy different numbers of sub-carriers in the frequency domain. For example, a certain PUCCH may occupy a number of sub-carriers in the frequency domain which may equal the number of sub-carriers occupied by 1 Physical Resource Block (PRB). A certain PUCCH may occupy a number of sub-carriers in the frequency domain which may equal the number of sub-carriers occupied by 16 PRBs.

The first uplink resource may occupy a small number of sub-carriers in the frequency domain. That is, the number of sub-carriers occupied by the first uplink resource in the frequency domain may be no greater than a preset number threshold. Then, the first uplink resource may be of small capacity. In this case, the first uplink resource generally cannot accommodate target UCI completely, whereas the second uplink resource, in particular that for transmitting CSI or uplink data, may generally be of large capacity. Then, the second uplink resource may generally accommodate the target HARQ. In this case, transmission of the target HARQ may generally be delayed, to multiplex the target HARQ and the uplink data, or the target HARQ and the target UCI, on the second uplink resource.

The first uplink resource may occupy a large number of sub-carriers in the frequency domain. That is, the number of sub-carriers occupied by the first uplink resource in the frequency domain may be greater than the preset number threshold. Then, the first uplink resource may be of large capacity. In this case, transmission of the target HARQ is generally not delayed, to multiplex the target HARQ and the target UCI on the first uplink resource.

It should be noted that the preset number threshold may be configured by a base station, specified by a communication protocol, configured by a high layer of the UE, and the like. A high layer of the UE may be a Media Access Control (MAC) layer or an RRC layer of the UE, and the like, where no specific limit thereto is set with embodiments herein.

In the fourth option, UE may determine, through internal high layer signaling, whether transmission of a target HARQ is delay-able. Unlike a physical layer of UE which can identify only a bitstream of communication data, a high layer of the UE (such as a MAC layer) may identify logic channel identifiers of different communication data, and may determine, according to an identifier of a logic channel, communication services corresponding to different communication data.

According to an embodiment herein, a high layer of UE may determine, according to an identifier of a logic channel, a type of communication service corresponding to communication data, to generate internal high layer signaling accordingly, and indicate, through the internal high layer signaling, whether transmission of the target HARQ is delay-able.

Optionally, a high layer of UE may determine, according to an identifier of a logic channel, that the target downlink data are communication data of a low-delay service (i.e., a delay-sensitive communication service). Then, the high layer of the UE may generate first internal high layer signaling. The physical layer of the UE may receive the first internal high layer signaling. Then, it may be determined that transmission of the target HARQ is undelay-able.

A high layer of UE may determine, according to an identifier of a logic channel, that the target downlink data are not communication data of a low-delay service. The high layer of the UE may generate second internal high layer signaling. The physical layer of the UE may receive the second internal high layer signaling. Then, it may be determined that transmission of the target HARQ is delay-able.

In step 403, when transmission of the target HARQ is delay-able, the UE may multiplex the target HARQ on the second uplink resource. Transmission of the target HARQ may be delay-able. Then, the UE may transmit, on the second uplink resource, the target HARQ and uplink data. Alternatively, the UE may transmit, on the second uplink resource, the target HARQ and target UCI.

It should be noted that the first uplink resource may be used for transmitting multiple target HARQs. Then, the UE may have to multiplex the multiple target HARQs on the second uplink resource when determining that transmission of each target HARQ is delay-able.

Transmission of the target HARQ may be undelay-able. Then, the UE may multiplex the target UCI on the first uplink resource. That is, the UE may transmit the target UCI and the target HARQ on the first uplink resource.

Uplink data cannot be transmitted on a PUCCH, i.e., uplink data cannot be transmitted on the first uplink resource. Therefore, when transmission of the target HARQ is undelay-able, the UE may have to discard the uplink data, and transmit the target HARQ on the first uplink resource.

Meanwhile, an uplink resource for transmitting a HARQ may generally be of small capacity. Therefore, when transmission of the target HARQ is undelay-able, if the first uplink resource does not have enough capacity to accommodate both the target UCI and the target HARQ, the UE may have to discard the target UCI, and transmit the target HARQ on the first uplink resource.

Of course, in application, when transmission of the target HARQ is undelay-able, the UE may simply discard uplink data and target UCI, and transmit the target HARQ on the first uplink resource.

In short, with embodiments herein, information is transmitted by multiplexing the target HARQ on the second uplink resource when the first uplink resource and the second uplink resource overlap in the time domain and transmission of the target HARQ is delay-able. Accordingly, UE is allowed to transmit a HARQ when a PUCCH for transmitting the HARQ overlaps another PUCCH or PUSCH in the time domain.

Figure 5:
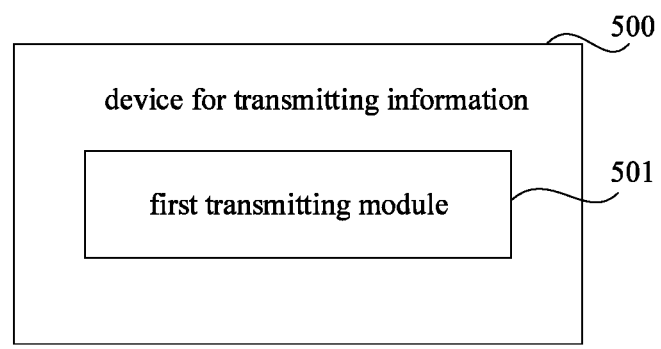
FIG. 5 is a block diagram of a device for transmitting information according to an exemplary embodiment.

FIG. 5 is a block diagram of a device 500 for transmitting information according to an exemplary embodiment. The device 500 for transmitting information may be the UE 20 as shown in FIG. 1. Referring to FIG. 5, the device 500 for transmitting information may include a first transmitting module 501. Of course, it should be understood that one or more of the modules described in this specification can be implemented with processing circuitry.

The first transmitting module 501 is adapted to, in response to that a first uplink resource and a second uplink resource overlap in a time domain, and that transmission of a target Hybrid Automatic Repeat Request (HARQ) is delay-able, multiplexing the target HARQ on the second uplink resource.

The first uplink resource is an uplink resource allocated by a base station to User Equipment (UE) for transmitting the target HARQ. The second uplink resource is an uplink resource allocated by the base station to the UE for transmitting uplink data or target Uplink Control Information (UCI). The target UCI includes a Scheduling Request (SR) or Channel State Information (CSI). The first uplink resource is located ahead of the second uplink resource in the time domain.

According to an embodiment herein, the first uplink resource may be used for transmitting multiple target HARQs. The first transmitting module 501 may include a first multiplexing sub-module. The first multiplexing sub-module may be adapted to, in response to that the first uplink resource and the second uplink resource overlap in the time domain, and that transmission of each of the multiple target HARQs is delay-able, multiplexing the multiple target HARQs on the second uplink resource.

According to an embodiment herein, the first transmitting module 501 may include an acquiring sub-module and a second multiplexing sub-module. The acquiring sub-module may be adapted to, in response to that the first uplink resource and the second uplink resource overlap in the time domain, and that transmission of the target HARQ is delay-able, acquiring a maximal delay by which transmission of the target HARQ is delay-able.

The second multiplexing sub-module may be adapted to, in response to that an interval between the first uplink resource and the second uplink resource in the time domain is no greater than the maximal delay, multiplexing the target HARQ on the second uplink resource.

Figure 6:
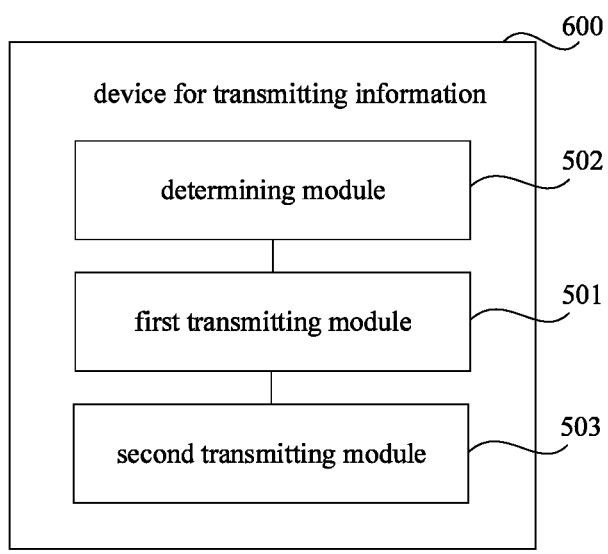
FIG. 6 is a block diagram of a device for transmitting information according to an exemplary embodiment.

As shown in FIG. 6, embodiments herein may further provide a device 600 for transmitting information. In addition to a module included in the device 500 for transmitting information, the device 600 for transmitting information may further include a determining module 502 and the second transmitting module 503. The determining module 502 may be adapted to determining whether transmission of the target HARQ is delay-able.

According to an embodiment herein, the second transmitting module 503 may be adapted to, in response to that the first uplink resource and the second uplink resource overlap in the time domain, and that transmission of the target HARQ is undelay-able, multiplexing the target UCI on the first uplink resource.

According to an embodiment herein, the determining module 502 may include a first receiving sub-module and a first determining sub-module. The first receiving sub-module may be adapted to receiving delay information sent by the base station. The delay information may indicate whether transmission of the target HARQ is delay-able. The first determining sub-module may be adapted to determining, according to the delay information, whether transmission of the target HARQ is delay-able.

According to an embodiment herein, the first receiving sub-module may be adapted to receiving a system broadcast message sent by the base station. The system broadcast message may include the delay information. Further, the first receiving sub-module may be adapted to receiving Radio Resource Control (RRC) signaling sent by the base station. The RRC signaling may include the delay information.

According to an embodiment herein, the delay information may be a HARQ process identifier. The HARQ process identifier may identify a HARQ process to which the target HARQ belongs.

The first receiving sub-module may be adapted to receiving first Downlink Control Information (DCI) sent by the base station. The first DCI may be configured to schedule target downlink data. The target HARQ may be configured to indicate whether the UE has received the target downlink data correctly. The first DCI may include the HARQ process identifier.

The first determining sub-module may be adapted to, in response to that the HARQ process identifier belongs to a set of target identifiers, determining that transmission of the target HARQ is delay-able. Each process identifier included in the set of target identifiers may identify a HARQ process in which transmission of a HARQ is delay-able. The first determining sub-module may be adapted to, in response to that the HARQ process identifier does not belong to the set of target identifiers, determining that transmission of the target HARQ is undelay-able.

According to an embodiment herein, the delay information may be a first interval indication. The first interval indication may be configured to indicate an interval between second DCI and target downlink data in the time domain. The second DCI may be configured to schedule the target downlink data. The target HARQ may be configured to indicate whether the UE has received the target downlink data correctly.

The first receiving sub-module may be adapted to receiving the second DCI sent by the base station. The second DCI may include the first interval indication.

The first determining sub-module may be adapted to, in response to that the interval indicated by the first interval indication is no greater than a first preset interval threshold, determining that transmission of the target HARQ is undelay-able, and, in response to that the interval indicated by the first interval indication is greater than the first preset interval threshold, determining that transmission of the target HARQ is delay-able.

According to an embodiment herein, the delay information may be a second interval indication. The second interval indication may be configured to indicate an interval between the target downlink data and the target HARQ in the time domain. The target HARQ may be configured to indicate whether the UE has received the target downlink data correctly.

The first receiving sub-module may be adapted to receiving third DCI sent by the base station. The third DCI may be configured to schedule the target downlink data. The third DCI may include the second interval indication.

The first determining sub-module may be adapted to, in response to that the interval indicated by the second interval indication is no greater than a second preset interval threshold, determining that transmission of the target HARQ is undelay-able; in response to that the interval indicated by the second interval indication is greater than the second preset interval threshold, determining that transmission of the target HARQ is delay-able.

According to an embodiment herein, the delay information may include a first interval indication and a second interval indication. The first interval indication may be configured to indicate an interval between fourth DCI and target downlink data in the time domain. The second interval indication may be configured to indicate an interval between the target downlink data and the target HARQ in the time domain. The fourth DCI may be configured to schedule the target downlink data. The target HARQ may be configured to indicate whether the UE has received the target downlink data correctly.

The first receiving sub-module may be adapted to receiving the fourth DCI sent by the base station. The fourth DCI may include the first interval indication and the second interval indication.

The first determining sub-module may be adapted to, in response to that a sum of the interval indicated by the first interval indication and the interval indicated by the second interval indication is no greater than a third preset interval threshold, determining that transmission of the target HARQ is undelay-able; in response to that the sum of the interval indicated by the first interval indication and the interval indicated by the second interval indication is greater than the third preset interval threshold, determining that transmission of the target HARQ is delay-able.

According to an embodiment herein, the delay information may be a length indication. The length indication may be configured to indicate a length of target downlink data in the time domain. The target HARQ may be configured to indicate whether the UE has received the target downlink data correctly.

The first receiving sub-module may be adapted to receiving fifth DCI sent by the base station. The fifth DCI may be configured to schedule the target downlink data. The fifth DCI may include the length indication.

The first determining sub-module may be adapted to, in response to that the length indicated by the length indication is no greater than a first preset length threshold, determining that transmission of the target HARQ is undelay-able, and, in response to that the length indicated by the length indication is greater than the first preset length threshold, determining that transmission of the target HARQ is delay-able.

According to an embodiment herein, the first receiving sub-module may be adapted to receiving sixth Downlink Control Information (DCI) sent by the base station. The sixth DCI may be configured to schedule target downlink data. The target HARQ may be configured to indicate whether the UE has received the target downlink data correctly. The sixth DCI may include the delay information.

According to an embodiment herein, the delay information may be further configured to indicate a maximal delay by which transmission of the target HARQ is delay-able.

In an additional embodiment, the determining module 502 may include a second determining sub-module. The second determining sub-module may be adapted to, in response to that the UE transmits data through a mini-slot, determining that transmission of the target HARQ is undelay-able, and, in response to that the UE transmits data with a slot, determining that transmission of the target HARQ is delay-able.

The second determining sub-module may be adapted to, in response to receiving first signaling sent by the base station, determining that transmission of the target HARQ is undelay-able. The first signaling may be configured to indicate that the UE transmits the data using the mini-slot. The second determining sub-module may be adapted to, in response to receiving second signaling sent by the base station, determining that transmission of the target HARQ is delay-able. The second signaling may be configured to indicate that the UE transmits the data with the slot.

The second determining sub-module may be adapted to, in response to that the UE receives, on a target downlink resource, DCI configured to schedule transmission of downlink data, determining that transmission of the target HARQ is undelay-able. The target downlink resource may differ from a downlink resource on which the UE receives DCI configured to schedule downlink data transmitted with the slot.

According to an embodiment herein, the first uplink resource may be a Physical Uplink Control Channel (PUCCH). The determining module 502 may include a first determining sub-module and a third determining sub-module. The first determining sub-module may be adapted to determining a format of the PUCCH. The third determining sub-module may be adapted to determining, according to the format of the PUCCH, whether transmission of the target HARQ is delay-able.

According to an embodiment herein, the first uplink resource may be a Physical Uplink Control Channel (PUCCH). The determining module 502 may include a second determining sub-module and a fourth determining sub-module.

The second determining sub-module may be adapted to determining a length of the PUCCH in the time domain. The fourth determining sub-module may be adapted to, in response to that the length of the PUCCH in the time domain is no greater than a second preset length threshold, determining that transmission of the target HARQ is undelay-able; in response to that the length of the PUCCH in the time domain is greater than the second preset length threshold, determining that transmission of the target HARQ is delay-able.

According to an embodiment herein, the first uplink resource may be a Physical Uplink Control Channel (PUCCH). The determining module 502 may include a third determining sub-module and a fifth determining sub-module. The third determining sub-module may be adapted to determining a number of sub-carriers occupied by the PUCCH in the frequency domain.

The fifth determining sub-module may be adapted to, in response to that the number of sub-carriers occupied by the PUCCH in the frequency domain is no greater than a preset number threshold, determining that transmission of the target HARQ is delay-able; in response to that the number of sub-carriers occupied by the PUCCH in the frequency domain is greater than the preset number threshold, determining that transmission of the target HARQ is undelay-able.

According to an embodiment herein, the determining module 502 may include a sixth determining sub-module. The sixth determining sub-module may be adapted to, in response to receiving first internal high layer signaling, determining that transmission of the target HARQ is undelay-able. The first internal high layer signaling may be generated by a high layer of the UE when a communication service corresponding to target downlink data is a low-delay service. The target HARQ may be configured to indicate whether the UE has received the target downlink data correctly. The sixth determining sub-module may be adapted to, in response to receiving second internal high layer signaling, determining that transmission of the target HARQ is delay-able. The second internal high layer signaling may be generated by the high layer of the UE when the communication service corresponding to the target downlink data is no low-delay service.

In short, with embodiments herein, information is transmitted by multiplexing the target HARQ on the second uplink resource when the first uplink resource and the second uplink resource overlap in the time domain and transmission of the target HARQ is delay-able. Accordingly, UE is allowed to transmit a HARQ when a PUCCH for transmitting the HARQ overlaps another PUCCH or PUSCH in the time domain.

A module of the device according to at least one embodiment herein may execute an operation in a mode elaborated in at least one embodiment of the method herein, which will not be repeated here.

Figure 7:
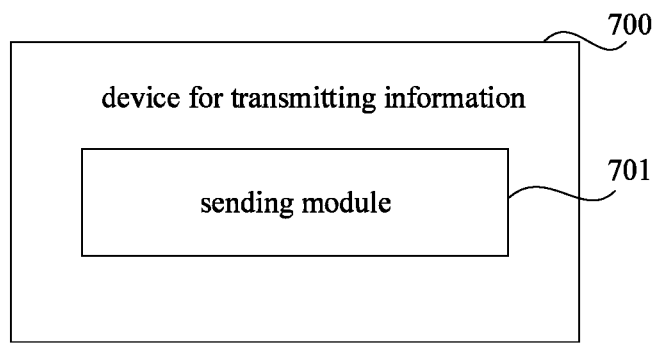
FIG. 7 is a block diagram of a device for transmitting information according to an exemplary embodiment.

FIG. 7 is a block diagram of a device 700 for transmitting information according to an exemplary embodiment. The device 700 for transmitting information may be a base station 10 as shown in FIG. 1. Referring to FIG. 7, the device 700 for transmitting information may include a sending module 701.

The sending module 701 can be adapted to sending delay information to User Equipment (UE). The delay information indicates whether transmission of a target Hybrid Automatic Repeat Request (HARQ) is delay-able. The UE is adapted to, in response to that a first uplink resource and a second uplink resource overlap in a time domain, and the delay information indicates that transmission of the target HARQ is delay-able, multiplexing the target HARQ on the second uplink resource.

The first uplink resource is an uplink resource allocated by a base station to the UE for transmitting the target HARQ. The second uplink resource is an uplink resource allocated by the base station to the UE for transmitting uplink data or target Uplink Control Information (UCI). The target UCI includes a Scheduling Request (SR) or Channel State Information (CSI). The first uplink resource is located ahead of the second uplink resource in the time domain.

According to an embodiment herein, the sending module 701 may include a first sending sub-module. The first sending sub-module may be adapted to sending a system broadcast message to the UE. The system broadcast message may include the delay information.

According to an embodiment herein, the sending module 701 may include a second sending sub-module. The second sending sub-module may be adapted to sending Radio Resource Control (RRC) signaling to the UE. The RRC signaling may include the delay information.

According to an embodiment herein, the delay information may be a HARQ process identifier. The HARQ process identifier may identify a HARQ process to which the target HARQ belongs. The sending module 701 may include a third sending sub-module.

The third sending sub-module may be adapted to sending first Downlink Control Information (DCI) to the UE. The first DCI may be configured to schedule target downlink data. The target HARQ may be configured to indicate whether the UE has received the target downlink data correctly. The first DCI may include the HARQ process identifier. The HARQ process identifier may indicate that transmission of the target HARQ is delay-able when the HARQ process identifier belongs to a set of target identifiers. Each process identifier included in the set of target identifiers may identify a HARQ process in which transmission of a HARQ is delay-able. The HARQ process identifier may indicate that transmission of the target HARQ is undelay-able when the HARQ process identifier does not belong to the set of target identifiers.

According to an embodiment herein, the sending module 701 may include a fourth sending sub-module. The fourth sending sub-module may be adapted to sending sixth Downlink Control Information (DCI) to the UE. The sixth DCI may be configured to schedule target downlink data. The target HARQ may be configured to indicate whether the UE has received the target downlink data correctly. The sixth DCI may include the delay information.

According to an embodiment herein, the delay information may be further configured to indicate a maximal delay by which transmission of the target HARQ is delay-able. In short, with embodiments herein, information is transmitted as follows. Delay information, which indicates whether transmission of a target HARQ is delay-able, may be sent to UE. In this way, the UE may multiplex the target HARQ on the second uplink resource when the first uplink resource and the second uplink resource overlap in the time domain and delay information indicates that transmission of the target HARQ is delay-able. Accordingly, UE is allowed to transmit a HARQ when a PUCCH for transmitting the HARQ overlaps another PUCCH or PUSCH in the time domain.

A module of the device according to at least one embodiment herein may execute an operation in a mode elaborated in at least one embodiment of the method herein, which will not be repeated here.

Figure 8:
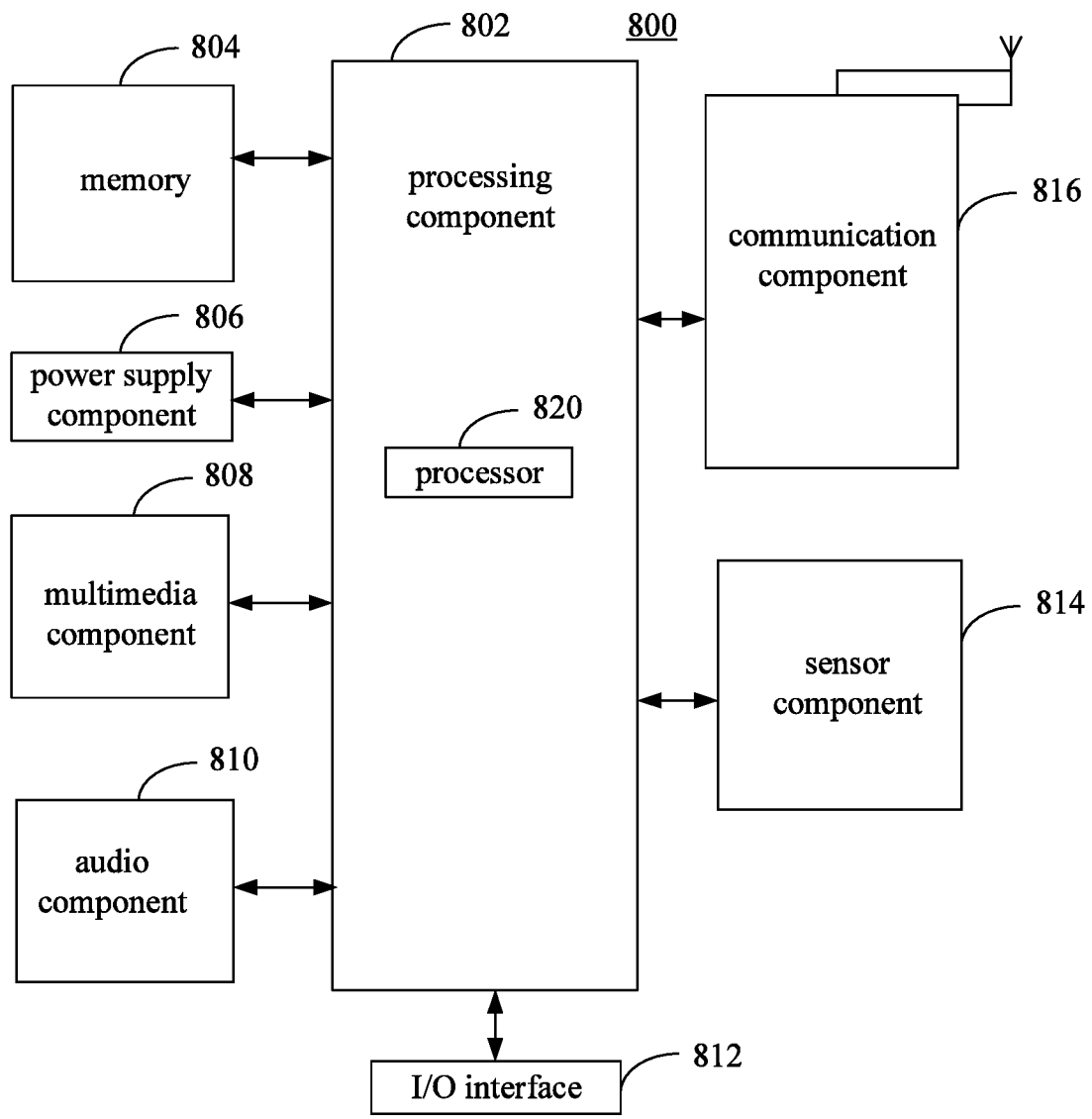
FIG. 8 is a block diagram of a device for transmitting information according to an exemplary embodiment.

FIG. 8 is a block diagram of a device 800 for transmitting information according to an exemplary embodiment. For example, the device 800 may be UE such as a mobile phone, a computer, digital broadcast UE, messaging equipment, a gaming console, tablet equipment, medical equipment, exercise equipment, a personal digital assistant, and the like.

Referring to FIG. 8, the device 800 may include at least one of a processing component 802, memory 804, a power supply component 806, a multimedia component 808, an audio component 810, an Input/Output (I/O) interface 812, a sensor component 814, a communication component 816, etc.

The processing component 802 may generally control an overall operation of the device 800, such as operations associated with display, a telephone call, data communication, a camera operation, a recording operation, etc. The processing component 802 may include one or more processors 820 to execute instructions so as to complete all or a part of an aforementioned method. In addition, the processing component 802 may include one or more modules to facilitate interaction between the processing component 802 and other components. For example, the processing component 802 may include a multimedia portion to facilitate interaction between the multimedia component 808 and the processing component 802.

The memory 804 may be adapted to storing various types of data to support the operation at the device 800. Examples of such data may include instructions of any application or method adapted to operating on the device 800, contact data, phonebook data, messages, pictures, videos, etc. The memory 804 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, and the like.

The power supply component 806 may supply electric power to various components of the device 800. The power supply component 806 may include a power management system, one or more power sources, and other components related to generating, managing, and distributing electricity for the device 800.

The multimedia component 808 may include a screen that provides an output interface between the device 800 and a user. The screen may include a Liquid Crystal Display (LCD), a Touch Panel (TP), and the like. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 808 may include at least one of a front camera or a rear camera. When the device 800 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 810 may be adapted to outputting and/or inputting an audio signal. For example, the audio component 810 may include a microphone (MIC). When the device 800 is in an operation mode such as a call mode, a recording mode, a voice recognition mode, etc., the MIC may be adapted to receiving an external audio signal. The received audio signal may be further stored in the memory 804 or may be sent via the communication component 816. The audio component 810 may further include a loudspeaker adapted to outputting the audio signal.

The I/O interface 812 may provide an interface between the processing component 802 and a peripheral interface portion. Such a peripheral interface portion may be a keypad, a click wheel, a button, and the like. Such a button may include but is not limited to at least one of a homepage button, a volume button, a start button, or a lock button.

The sensor component 814 may include one or more sensors for assessing various states of the device 800. For example, the sensor component 814 may detect an on/off state of the device 800 and relative positioning of components such as the display and the keypad of the device 800. The sensor component 814 may further detect a change in the position of the device 800 or of a component of the device 800, whether there is contact between the device 800 and a user, the orientation or acceleration/deceleration of the device 800, a change in the temperature of the device 800, and the like. The sensor component 814 may include a proximity sensor adapted to detecting existence of a nearby object without physical contact. The sensor component 814 may further include an optical sensor, such as a Complementary Metal-Oxide-Semiconductor (CMOS) or a Charge-Coupled-Device (CCD) image sensor used in an imaging application. The sensor component 814 may further include an acceleration sensor, a gyroscope sensor, a magnetic sensor, a pressure sensor, a temperature sensor, and the like.

The communication component 816 may be adapted to facilitating wired or wireless communication between the device 800 and other equipment. The device 800 may access a wireless network based on any communication standard such as Wi-Fi, 2G, 3G . . . , or a combination thereof. The communication component 816 may broadcast related information or receive a broadcast signal from an external broadcast management system via a broadcast channel. The communication component 816 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

The device 800 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, and the like, to implement a technical process executed by UE 20 according to a method embodiment herein.

A non-transitory computer-readable storage medium including instructions, such as memory 804 including instructions, may be provided. The instructions may be executed by the processor 820 of the device 800 to implement a technical process executed by UE 20 according to a method embodiment herein. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, and the like.

Figure 9:
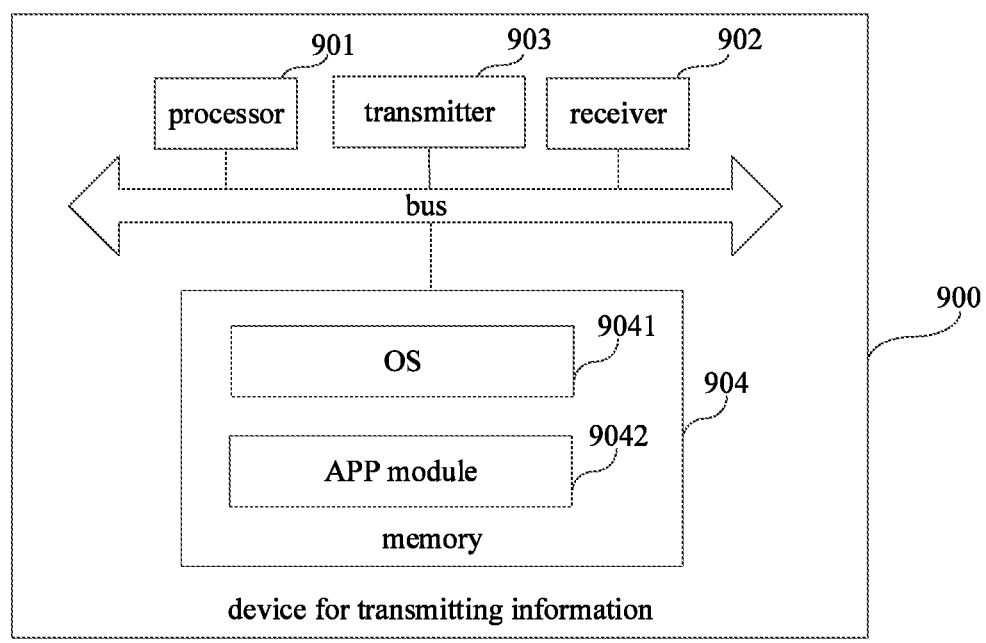
FIG. 9 is a block diagram of a device for transmitting information according to an exemplary embodiment.

FIG. 9 is a block diagram of a device 900 for transmitting information according to an exemplary embodiment. For example, the device 900 for transmitting information may be a base station. As shown in FIG. 9, the device 900 for transmitting information may include a processor 901, a receiver 902, a transmitter 903, and memory 904. The receiver 902, the transmitter 903, and the memory 904 may respectively be connected to the processor 901 through a bus.

The processor 901 may include one or more processing cores. By running a software program, a module, etc., the processor 901 may execute a method executed by a base station in the method for transmitting information according to embodiments herein. The memory 904 may be adapted to storing a software program, a module, etc. The memory 904 may store an operating system 9041, at least one application module 9042 required by a function, and the like. The receiver 902 may be adapted to receiving communication data sent by other equipment. The transmitter 903 may be adapted to sending communication data to other equipment.

Figure 10:
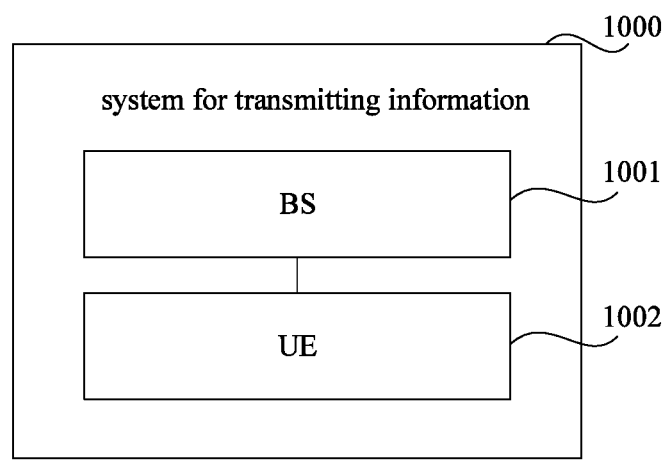
FIG. 10 is a block diagram of a system for transmitting information according to an exemplary embodiment.

FIG. 10 is a block diagram of a system 1000 for transmitting information according to an exemplary embodiment. As shown in FIG. 10, the system 1000 for transmitting information may include a base station 1001 and UE 1002. The base station 1001 may be adapted to executing a method for transmitting information executed by a base station according to an embodiment shown in FIG. 4. The UE 1002 may be adapted to executing a UE-executed method for transmitting information according to an embodiment shown in FIG. 4.

A computer-readable storage medium may be provided. The computer-readable storage medium may be non-transitory computer-readable storage medium. The computer-readable storage medium may include a computer program. When executed by a processing component, the computer program may implement a method for transmitting information. For example, the method may be as follows. When a first uplink resource and a second uplink resource overlap in a time domain, and transmission of a target Hybrid Automatic Repeat Request (HARQ) is delay-able, the target HARQ is multiplexed on the second uplink resource. The first uplink resource is an uplink resource allocated by a base station to User Equipment (UE) for transmitting the target HARQ. The second uplink resource is an uplink resource allocated by the base station to the UE for transmitting uplink data or target Uplink Control Information (UCI). The target UCI includes a Scheduling Request (SR) or Channel State Information (CSI). The first uplink resource is located ahead of the second uplink resource in the time domain.

Alternatively, the method for transmitting information may be as follows. Delay information may be sent to User Equipment (UE). The delay information indicates whether transmission of a target Hybrid Automatic Repeat Request (HARQ) is delay-able. The UE is adapted to, in response to that a first uplink resource and a second uplink resource overlap in a time domain, and the delay information indicates that transmission of the target HARQ is delay-able, multiplexing the target HARQ on the second uplink resource. The first uplink resource is an uplink resource allocated by a base station to the UE for transmitting the target HARQ. The second uplink resource is an uplink resource allocated by the base station to the UE for transmitting uplink data or target Uplink Control Information (UCI). The target UCI includes a Scheduling Request (SR) or Channel State Information (CSI). The first uplink resource is located ahead of the second uplink resource in the time domain.

Other implementations of the subject disclosure will be apparent to a person having ordinary skill in the art that has considered the specification and or practiced the subject disclosure. The subject disclosure is intended to cover any variation, use, or adaptation of the subject disclosure following the general principles of the subject disclosure and including such departures from the subject disclosure as come within common knowledge or customary practice in the art. The specification and the embodiments are intended to be exemplary only, with a true scope and spirit of the subject disclosure being indicated by the appended claims.

It should be noted that the subject disclosure is not limited to the exact construction that has been described above and illustrated in the accompanying drawings, and that various modifications and changes can be made to the subject disclosure without departing from the scope of the subject disclosure. It is intended that the scope of the subject disclosure is limited only by the appended claims.

What is claimed is:
1. A method for transmitting information, comprising:
multiplexing a target Hybrid Automatic Repeat Request (HARQ) on a second uplink resource when a first uplink resource and the second uplink resource overlap in a time domain and transmission of the target HARQ is delay-able, wherein:
the first uplink resource is an uplink resource allocated by a base station to User Equipment (UE) for transmitting the target HARQ,
the second uplink resource is an uplink resource allocated by the base station to the UE for transmitting uplink data or target Uplink Control Information (UCI),
the target UCI comprises a Scheduling Request (SR) or Channel State Information (CSI), and
the first uplink resource is located before the second uplink resource in the time domain,
wherein multiplexing the target HARQ on the second uplink resource comprises:
acquiring a maximal delay by which transmission of the target HARQ is delay-able when the first uplink resource and the second uplink resource overlap in the time domain and transmission of the target HARQ is delay-able; and
multiplexing the target HARQ on the second uplink resource when an interval between the first uplink resource and the second uplink resource in the time domain is no greater than the maximal delay.

2. The method of claim 1, wherein the first uplink resource is used for transmitting multiple target HARQs and multiplexing the target HARQ on the second uplink resource further comprises:
multiplexing the multiple target HARQs on the second uplink resource when the first uplink resource and the second uplink resource overlap in the time domain and transmission of each of the multiple target HARQs is delay-able.

3. The method of claim 1, further comprising:
multiplexing the target UCI on the first uplink resource when the first uplink resource and the second uplink resource overlap in the time domain, and transmission of the target HARQ is undelay-able.

4. The method of claim 1, further comprising:
determining whether transmission of the target HARQ is delay-able.

5. The method of claim 4, wherein the determining whether transmission of the target HARQ is delay-able further comprises:
receiving delay information sent by the base station, the delay information indicating whether transmission of the target HARQ is delay-able; and
determining whether transmission of the target HARQ is delay-able based on the delay information.

6. The method of claim 5, wherein the receiving the delay information sent by the base station further comprises at least one of:
receiving a system broadcast message sent by the base station, the system broadcast message comprising the delay information, or
receiving Radio Resource Control (RRC) signaling sent by the base station, the RRC signaling comprising the delay information.

7. The method of claim 5, wherein the delay information is a HARQ process identifier that identifies a HARQ process to which the target HARQ belongs, and the receiving the delay information sent by the base station further comprises:
receiving first Downlink Control Information (DCI) sent by the base station, where the first DCI is configured to schedule target downlink data, the target HARQ is configured to indicate whether the UE has received the target downlink data correctly, and the first DCI comprises the HARQ process identifier,
wherein the determining whether transmission of the target HARQ is delay-able based on the delay information further comprises:
determining that transmission of the target HARQ is delay-able when the HARQ process identifier belongs to a set of target identifiers, each process identifier comprised in the set of target identifiers identifies a HARQ process in which transmission of a HARQ is delay-able; and
determining that transmission of the target HARQ is undelay-able when the HARQ process identifier does not belong to the set of target identifiers.

8. The method of claim 5, wherein:
the delay information is a first interval indication that indicates an interval between second DCI and target downlink data in the time domain, the second DCI being configured to schedule the target downlink data, the target HARQ being configured to indicate whether the UE has received the target downlink data correctly, and the receiving the delay information sent by the base station further comprises receiving the second DCI sent by the base station, the second DCI comprising the first interval indication, wherein the determining whether transmission of the target HARQ is delay-able based on the delay information comprises:
in response to that the interval indicated by the first interval indication is no greater than a first preset interval threshold, determining that transmission of the target HARQ is undelay-able, and
in response to that the interval indicated by the first interval indication is greater than the first preset interval threshold, determining that transmission of the target HARQ is delay-able,
the delay information is a second interval indication that indicates an interval between the target downlink data and the target HARQ in the time domain, the target HARQ being configured to indicate whether the UE has received the target downlink data correctly, the receiving the delay information sent by the base station comprises receiving third DCI sent by the base station, wherein the third DCI is configured to schedule the target downlink data, wherein the third DCI comprises the second interval indication, wherein the determining, according to the delay information, whether transmission of the target HARQ is delay-able comprises:
in response to that the interval indicated by the second interval indication is no greater than a second preset interval threshold, determining that transmission of the target HARQ is undelay-able; and
in response to that the interval indicated by the second interval indication is greater than the second preset interval threshold, determining that transmission of the target HARQ is delay-able, or
the delay information comprises a first interval indication and a second interval indication, where the first interval indication is configured to indicate an interval between fourth DCI and target downlink data in the time domain, the second interval indication is configured to indicate an interval between the target downlink data and the target HARQ in the time domain, the fourth DCI is configured to schedule the target downlink data, the target HARQ is configured to indicate whether the UE has received the target downlink data correctly, and the receiving the delay information sent by the base station comprises receiving the fourth DCI sent by the base station, the fourth DCI comprises the first interval indication and the second interval indication, wherein the determining, according to the delay information, whether transmission of the target HARQ is delay-able comprises:
in response to that a sum of the interval indicated by the first interval indication and the interval indicated by the second interval indication is no greater than a third preset interval threshold, determining that transmission of the target HARQ is undelay-able; and
in response to that the sum of the interval indicated by the first interval indication and the interval indicated by the second interval indication is greater than the third preset interval threshold, determining that transmission of the target HARQ is delay-able, or
the delay information is a length indication that is configured to indicate a length of target downlink data in the time domain, the target HARQ being configured to indicate whether the UE has received the target downlink data correctly, the receiving the delay information sent by the base station comprises receiving fifth DCI sent by the base station, the fifth DCI being configured to schedule the target downlink data, the fifth DCI including the length indication, the determining whether transmission of the target HARQ is delay-able based on the delay information further comprises:
in response to that the length indicated by the length indication is no greater than a first preset length threshold, determining that transmission of the target HARQ is undelay-able; and
in response to that the length indicated by the length indication is greater than the first preset length threshold, determining that transmission of the target HARQ is delay-able.

9. The method of claim 5, wherein the receiving the delay information sent by the base station comprises:
receiving sixth Downlink Control Information (DCI) sent by the base station, the sixth DCI being configured to schedule target downlink data, the target HARQ being configured to indicate whether the UE has received the target downlink data correctly, the sixth DCI comprising the delay information,
wherein the delay information is further configured to indicate the maximal delay by which transmission of the target HARQ is delay-able.

10. The method of claim 4, wherein the determining whether transmission of the target HARQ is delay-able further comprises:
determining that transmission of the target HARQ is undelay-able when the UE transmits data through a mini-slot; and
determining that transmission of the target HARQ is delay-able when the UE transmits data with a slot.

11. The method of claim 10, wherein the determining that transmission of the target HARQ is undelay-able when the UE transmits the data using the mini-slot further comprises at least one of:
determining that transmission of the target HARQ is undelay-able when receiving first signaling sent by the base station, the first signaling being configured to indicate that the UE transmits the data using the mini-slot, wherein determining that transmission of the target HARQ is delay-able when the UE transmits the data with the slot further comprises determining that transmission of the target HARQ is delay-able when receiving second signaling sent by the base station, the second signaling being configured to indicate that the UE transmits the data with the slot; or
determining that transmission of the target HARQ is undelay-able when the UE receives, on a target downlink resource, DCI configured to schedule transmission of downlink data, the target downlink resource differs from a downlink resource on which the UE receives DCI configured to schedule downlink data transmitted with the slot.

12. The method of claim 4, wherein:
the first uplink resource is a Physical Uplink Control Channel (PUCCH), and the determining whether transmission of the target HARQ is delay-able further comprises at least one of:
determining a format of the PUCCH; and
determining whether transmission of the target HARQ is delay-able based on the format of the PUCCH,
the first uplink resource is a Physical Uplink Control Channel (PUCCH), and the determining whether transmission of the target HARQ is delay-able further comprises:
determining a length of the PUCCH in the time domain;
in response to that the length of the PUCCH in the time domain is no greater than a second preset length threshold, determining that transmission of the target HARQ is undelay-able; and
in response to that the length of the PUCCH in the time domain is greater than the second preset length threshold, determining that transmission of the target HARQ is delay-able, or
determining a number of sub-carriers occupied by the PUCCH in the frequency domain;
in response to that the number of sub-carriers occupied by the PUCCH in the frequency domain is no greater than a preset number threshold, determining that transmission of the target HARQ is delay-able; and
in response to that the number of sub-carriers occupied by the PUCCH in the frequency domain is greater than the preset number threshold, determining that transmission of the target HARQ is undelay-able.

13. The method of claim 4, wherein the determining whether transmission of the target HARQ is delay-able further comprises:
determining that transmission of the target HARQ is undelay-able w % ben receiving first internal high layer signaling, wherein the first internal high layer signaling is generated by a high layer of the UE in response to that a communication service corresponding to target downlink data is a low-delay service, and the target HARQ is configured to indicate whether the UE has received the target downlink data correctly; and
determining that transmission of the target HARQ is delay-able when receiving second internal high layer signaling, wherein the second internal high layer signaling is generated by the high layer of the UE in response to that the communication service corresponding to the target downlink data is no low-delay service.

14. A method for transmitting information, comprising:
sending delay information to User Equipment (UE), the delay information indicates whether transmission of a target Hybrid Automatic Repeat Request (HARQ) is delay-able,
wherein:
the UE is configured to multiplex the target HARQ on the second uplink resource when a first uplink resource and a second uplink resource overlap in a time domain and the delay information indicates that transmission of the target HARQ is delay-able, the first uplink resource is an uplink resource allocated by a base station to the UE for transmitting the target HARQ, the second uplink resource is an uplink resource allocated by the base station to the UE for transmitting uplink data or target Uplink Control Information (UCI), the target UCI comprises a Scheduling Request (SR) or Channel State Information (CSI), and the first uplink resource is located ahead of the second uplink resource in the time domain, wherein the delay information is further configured to indicate a maximal delay by which transmission of the target HARQ is delay-able.

15. The method of claim 14, wherein the sending the delay information to the UE further comprises at least one of:

sending a system broadcast message to the UE, the system broadcast message comprising the delay information, sending Radio Resource Control (RRC) signaling to the UE, the RRC signaling comprising the delay information, or sending sixth Downlink Control Information (DCI) to the UE, the sixth DCI being configured to schedule target downlink data, the target HARQ being configured to indicate whether the UE has received the target downlink data correctly, and the sixth DCI comprises the delay information.

16. The method of claim 14, wherein the delay information is a HARQ process identifier that identifies a HARQ process to which the target HARQ belongs, and the sending the delay information to the UE comprises:

sending first Downlink Control Information (DCI) to the UE, the first DCI being configured to schedule target downlink data, the target HARQ being configured to indicate whether the UE has received the target downlink data correctly, and the first DCI comprises the HARQ process identifier, wherein the HARQ process identifier indicates, when the HARQ process identifier belongs to a set of target identifiers, that transmission of the target HARQ is delay-able, and each process identifier comprised in the set of target identifiers identifies a HARQ process in which transmission of a HARQ is delay-able, and wherein the HARQ process identifier indicates, when the HARQ process identifier does not belong to the set of target identifiers, that transmission of the target HARQ is undelay-able.

17. A device for transmitting information, comprising a processor and memory that is configured to storing an instruction executable by the processor, the processor being configured to perform operations comprising:

multiplexing a target Hybrid Automatic Repeat Request (HARQ) on a second uplink resource when a first uplink resource and the second uplink resource overlap in a time domain and transmission of the target HARQ is delay-able, wherein:

the first uplink resource is an uplink resource allocated by a base station to User Equipment (UE) for transmitting the target HARQ, the second uplink resource is an uplink resource allocated by the base station to the UE for transmitting uplink data or target Uplink Control Information (UCI), the target UCI comprises a Scheduling Request (SR) or Channel State Information (CSI), and the first uplink resource is located ahead of the second uplink resource in the time domain, wherein multiplexing the target HARQ on the second uplink resource comprises:

acquiring a maximal delay by which transmission of the target HARQ is delay-able when the first uplink resource and the second uplink resource overlap in the time domain and transmission of the target HARQ is delay-able; and multiplexing the target HARQ on the second uplink resource when an interval between the first uplink resource and the second uplink resource in the time domain is no greater than the maximal delay.

\* \* \* \* \*